(12) United States Patent
Sakamoto et al.

(10) Patent No.: US 10,035,453 B2
(45) Date of Patent: Jul. 31, 2018

(54) VEHICLE

(71) Applicant: Kawasaki Jukogyo Kabushiki Kaisha, Kobe-shi, Hyogo (JP)

(72) Inventors: Takuya Sakamoto, Akashi (JP); Taro Iwamoto, Kakogawa (JP); Osamu Tani, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 0 days.

(21) Appl. No.: 15/388,983

(22) Filed: Dec. 22, 2016

(65) Prior Publication Data

US 2017/0182929 A1 Jun. 29, 2017

(30) Foreign Application Priority Data

Dec. 28, 2015 (JP) ................................. 2015-256648

(51) Int. Cl.
*B60Q 1/10* (2006.01)
*F21S 41/63* (2018.01)
(Continued)

(52) U.S. Cl.
CPC ............ *B60Q 1/10* (2013.01); *B60Q 1/0041* (2013.01); *B60Q 1/12* (2013.01); *B60Q 1/18* (2013.01);
(Continued)

(58) Field of Classification Search
CPC .......... B60Q 1/10; B60Q 1/0041; B60Q 1/18; B60Q 2300/054; B60Q 2300/136;
(Continued)

(56) References Cited

U.S. PATENT DOCUMENTS

| 9,725,125 B2 * | 8/2017 | Iwamoto | ................... B62J 6/02 |
| 2013/0241413 A1 * | 9/2013 | Ooba | ................... B60Q 1/0041 315/82 |
| 2015/0081168 A1 | 3/2015 | McWithey et al. | |
| 2016/0185409 A1 * | 6/2016 | Iwamoto | .............. B60Q 1/1423 362/467 |

FOREIGN PATENT DOCUMENTS

| DE | 102010030675 A1 | 1/2011 | |
| EP | 2669163 A1 * | 12/2013 | ............... B60Q 1/18 |

(Continued)

OTHER PUBLICATIONS

European Patent Office, Extended European Search Report Issued in European Application No. 16206585.8, dated May 23, 2017, Germany, 7 pages.

*Primary Examiner* — Mary Ellen Bowman
(74) *Attorney, Agent, or Firm* — Alleman Hall Creasman & Tuttle LLP

(57) ABSTRACT

A vehicle which turns in a state in which a vehicle body is banked from an upright state to a first side in a vehicle width direction of the vehicle body, comprises a lamp which is attached to the vehicle body, and irradiates a lamp irradiation region set in front of the vehicle body; a detecting section which detects a change over time of a posture of the vehicle body while the vehicle is traveling; and a control section which controls the lamp in such a manner that the lamp irradiation region is changed based on the change over time of the posture of the vehicle body which is detected by the detecting section.

11 Claims, 10 Drawing Sheets

(51) Int. Cl.
*F21S 41/20* (2018.01)
*B60Q 1/00* (2006.01)
*B60Q 1/18* (2006.01)
*B62J 6/02* (2006.01)
*H05B 37/02* (2006.01)
*B60Q 1/12* (2006.01)

(52) U.S. Cl.
CPC ............... *B62J 6/02* (2013.01); *F21S 41/285* (2018.01); *F21S 41/635* (2018.01); *H05B 37/0227* (2013.01); *B60Q 2300/054* (2013.01); *B60Q 2300/136* (2013.01); *B62K 2207/02* (2013.01)

(58) Field of Classification Search
CPC ...... B62J 6/02; F21S 48/1225; F21S 48/1721; H05B 37/0227
See application file for complete search history.

(56) References Cited

FOREIGN PATENT DOCUMENTS

| | | |
|---|---|---|
| JP | 4963312 B2 | 6/2012 |
| JP | 2013248988 A | 12/2013 |
| JP | 2013249064 A | 12/2013 |

\* cited by examiner

VEHICLE

CROSS-REFERENCE TO THE RELATED APPLICATION

This application claims priority to and the benefit of Japanese Patent Application No. 2015-256648 filed on Dec. 28, 2015, the entire disclosure of which is incorporated herein by reference.

BACKGROUND OF THE INVENTION

Field of the Invention

The present invention relates to a vehicle which turns in a state in which its vehicle body is banked (tilted) from an upright state to one side in a vehicle width direction.

Description of the Related Art

In some cases, an exemplary vehicle such as a motorcycle turns in a state in which its vehicle body is banked while the vehicle is traveling. The vehicle is provided with a head lamp to secure a rider's view irrespective of whether or not the vehicle body is banked. For example, in a case where the vehicle turns in a state in which its vehicle body is banked from an upright state to the left, a region to be irradiated by the head lamp is lowered at the left from the perspective of a rider straddling the vehicle body. In other words, it becomes difficult for the head lamp to irradiate a front region in the traveling direction which is distant from the vehicle body, in a region which is inward with respect to the turning direction of the vehicle body.

As a solution to this, for example, Japanese Patent No. 4963312 discloses a configuration in which a lens and a light emitting element of a head lamp are rotated in a direction opposite to the direction in which the vehicle body is banked, in order to change an irradiation range to irradiate the region which is inward with respect to the turning direction.

Further, Japanese Laid-Open Patent Application Publication No. 2013-248988 discloses a vehicle including a light including an auxiliary lamp which is lighted depending on the bank angle of the vehicle body. In this disclosure, when a controller determines that the bank angle detected by a sensor becomes a predetermined value or more, the auxiliary lamp is lighted (turned on). The irradiation range of the light is changed by adding the irradiation region of the auxiliary lamp to the irradiation region of the head lamp while the vehicle is turning.

There is a time lag which occurs from when the vehicle body is banked until the irradiation range is changed. For this reason, for example, in a case where the vehicle body is banked quickly, a rider feels a time lag in a change in the irradiation range. In this case, it is necessary to avoid a situation in which the rider cannot well see the road surface. On the other hand, if the timing at which the irradiation range starts to be changed is merely advanced to prevent such a time lag in the change in the irradiation range, then a person riding in another vehicle coming from an opposite direction, a person riding in another vehicle located in the vicinity of the vehicle, or a person walking around the vehicle (hereinafter these will be referred to as, for example, a person riding in a vehicle coming from an opposite direction) will be bothered by glaring light.

In view of the above, an object of the present invention is prevent, for example, a situation in which a person riding in a vehicle coming from an opposite direction is bothered by glaring light while allowing a rider to well see a road surface while a vehicle is turning.

SUMMARY OF THE INVENTION

According to an aspect of the present invention, a vehicle which turns in a state in which a vehicle body is banked from an upright state to a first side in a vehicle width direction of the vehicle body, comprises a lamp which is attached to the vehicle body, and irradiates a lamp irradiation region set in front of the vehicle body; a detecting section which detects a change over time of a posture of the vehicle body while the vehicle is traveling; and a control section which controls the lamp in such a manner that the lamp irradiation region is changed based on the change over time of the posture of the vehicle body which is detected by the detecting section.

In accordance with this configuration, since the lamp irradiation region is changed based on the change over time of the posture of the vehicle body which is detected by the detecting section while the vehicle is traveling, the lamp can be lighted so as to be able to irradiate the irradiation region suitable for a future vehicle body posture. This makes it possible to prevent, for example, a situation in which a person riding in a vehicle coming from an opposite direction is bothered by glaring light emitted from the auxiliary lamp while allowing a rider to well see a road surface during the turning.

The control section may advance timing at which the lamp irradiation region starts to be changed in such a manner that the timing is earlier with an increase in the change over time of the posture of the vehicle body in a direction in which the vehicle body is banked to the first side in the vehicle width direction.

In accordance with this configuration, as the change over time of the posture of the vehicle body in a direction in which the vehicle body is banked to the first side in the vehicle width direction increases, namely, when the control section detects that the vehicle body is banked quickly to the first side in the vehicle width direction, the timing at which the lamp irradiation region starts to be changed can be advanced.

The vehicle may further comprise: a bank angle detecting section which detects a bank angle of the vehicle body, wherein the control section may decide timing at which the lamp irradiation region starts to be changed, based on the change over time of the posture of the vehicle body which is detected by the detecting section and the bank angle detected by the bank angle detecting section.

In accordance with this configuration, the control section decides the timing at which the lamp irradiation region starts to be changed, based on the bank angle in addition to the change over time of the posture of the vehicle body which is detected by the detecting section. Therefore, it becomes possible to accurately decide the timing at which the lamp irradiation region starts to be changed in order for the lamp to irradiate the suitable lamp irradiation region in a specified vehicle body posture, with reference to how the rider banks the vehicle body while the vehicle is traveling.

The control section may limit a change in the lamp irradiation region when a bank angle of the vehicle body or the change over time of the posture of the vehicle body in the direction in which the vehicle body is banked to the first side in the vehicle width direction exceeds an upper limit value.

In accordance with this configuration, since the control section limits a change in the lamp irradiation region when the bank angle or the change over time of the posture of the vehicle body in the direction in which the vehicle body is banked to the first side in the vehicle width direction exceeds the upper limit value, it becomes possible to prevent an excessive change in the lamp irradiation region. In addition, it becomes possible to prevent, for example, a situation in which the timing at which the lamp irradiation region starts to be changed is advanced excessively, and thereby a person riding in a vehicle coming from an opposite direction is bothered for a moment by glaring light emitted from the auxiliary lamp.

The control section may limit a change in the lamp irradiation region when the bank angle of the vehicle body or the change over time of the posture of the vehicle body in the direction in which the vehicle body is banked to the first side in the vehicle width direction is less than a lower limit value.

In accordance with this configuration, the control section limits a change in the lamp irradiation region when the bank angle or the change over time of the posture of the vehicle body in the direction in which the vehicle body is banked to the first side in the vehicle width direction is less than the lower limit value. Therefore, in a case where a change in the vehicle body posture is less, a change in the lamp irradiation region can be prevented. In addition, it becomes possible to prevent, for example, a situation in which the timing at which the lamp irradiation region starts to be changed is advanced excessively, and thereby a person riding in a vehicle coming from an opposite direction is bothered by glaring light emitted from the auxiliary lamp.

The lamp may include a head lamp, and an auxiliary lamp disposed at a location that is outward in the vehicle width direction relative to the head lamp, the lamp irradiation region may include a head lamp irradiation region irradiated by the head lamp, and an auxiliary lamp irradiation region which is set in front of the head lamp irradiation region and is irradiated by the auxiliary lamp, and the control section may cause the auxiliary lamp to be lighted to change the lamp irradiation region based on the change over time of the posture of the vehicle body.

In accordance with this configuration, since the auxiliary lamp is lighted based on the change over time of the posture of the vehicle body, the auxiliary lamp can irradiate the irradiation region suitable for a future vehicle body posture. This makes it possible to prevent, for example, the situation in which the timing at which the auxiliary lamp starts to be lighted is merely advanced, and thereby the person riding in the vehicle coming from the opposite direction is bothered by the glaring light emitted from the auxiliary lamp, while allowing the rider to well see the road surface during the turning.

The control section may change timing at which the auxiliary lamp starts to be lighted to change the lamp irradiation region.

In accordance with this configuration, since the control section decides the timing at which the auxiliary lamp starts to be lighted based on the change over time of the vehicle body posture, the control section can provide a lighting start command to the auxiliary lamp at the timing suitable for a future vehicle body posture.

The control section may perform an initial control for gradually increasing luminosity of light emitted from the auxiliary lamp with an increase in a bank angle of the vehicle body from the timing at which the auxiliary lamp starts to be lighted.

In accordance with this configuration, since the luminosity of the light emitted from the auxiliary lamp is gradually increased with an increase in the bank angle from the timing at which the auxiliary lamp starts to be lighted, a rapid change in the luminosity of the light can be prevented. This makes it possible to prevent, for example, a situation in which the rider feels discomfort due to abrupt lighting of the auxiliary lamp.

The control section may increase a change rate of luminosity of light emitted from the auxiliary lamp with respect to a bank angle of the vehicle body, with an increase in the change over time of the posture of the vehicle body in the direction in which the vehicle body is banked to the first side in the vehicle width direction.

In accordance with this configuration, as the change over time of the posture of the vehicle body in the direction in which the vehicle body is banked to the first side in the vehicle width direction increases, namely, when the detecting section detects a change in the vehicle body posture in which the vehicle body is quickly banked to the first side in the vehicle width direction, the change rate of the luminosity of the light emitted from the auxiliary lamp with respect to the bank angle is increased. This makes it possible to set the luminosity of the light emitted from the auxiliary lamp according a future vehicle body posture while preventing the rider from feeling discomfort due to a lag in the lighting of the auxiliary lamp.

The control section may cause the auxiliary lamp to be lighted in a predetermined set lighting state at predetermined luminosity of the light, when the control section detects that the vehicle body is in a predetermined set bank state, and the control section may cause the auxiliary lamp to be lighted in a predetermined preceding lighting state at predetermined luminosity of the light which is lower than that of the predetermined set lighting state, when the control section detects that the vehicle body is in a predetermined preceding bank state which occurs before the vehicle body reaches the predetermined set bank state.

In accordance with this configuration, the timing at which the auxiliary lamp starts to be lighted is set based on the change over time of the posture of the vehicle body. In addition, when the vehicle body is banked to the predetermined preceding bank state with a bank angle smaller than that of the predetermined set bank state, the auxiliary lamp can be lighted in the preceding lighting state at the luminosity lower than that of the set lighting state. Thus, before the auxiliary lamp becomes the set lighting state, it can irradiate the auxiliary lamp irradiation region of the front region in the traveling direction. This allows the rider to better see the road surface of the front region in the traveling direction, while more effectively preventing the rider from feeling discomfort during the turning.

The lamp may be the head lamp, the lamp irradiation region may be the head lamp irradiation region irradiated by the head lamp, and the control section may rotate the head lamp irradiation region in a direction opposite to a direction in which the vehicle body is banked, based on the change over time of the posture of the vehicle body, to change the head lamp irradiation region.

In accordance with this configuration, since the head lamp irradiation region is rotated based on the change over time of the posture of the vehicle body, the head lamp can irradiate the irradiation region suitable for a future vehicle body posture. This makes it possible to prevent, for example, the situation in which the timing at which the head lamp irradiation region is rotated is merely advanced, and thereby the person riding in the vehicle coming from the opposite direction is bothered by the glaring light, while allowing the rider to well see the road surface during the turning.

According to another aspect of the present invention, a vehicle which turns in a state in which a vehicle body is banked from an upright state to a first side in a vehicle width direction of the vehicle body, comprises a head lamp which is attached to the vehicle body, and irradiates a head lamp irradiation region set in front of the vehicle body; an auxiliary lamp which is attached to the vehicle body, and irradiates an auxiliary lamp irradiation region set in front of the head lamp irradiation region, on the first side in the vehicle width direction; a detecting section which detects as a tilting state of the vehicle body a change over time of a posture of the vehicle body while the vehicle is traveling; and a control section which decides timing at which the auxiliary lamp starts to be turned off, based on the change over time of the posture of the vehicle body which is detected by the detecting section.

In accordance with this configuration, since the timing at which the auxiliary lamp starts to be turned off is decided based on the change over time of the vehicle body which is detected by the detecting section while the vehicle is traveling, it becomes possible to provide a lighting-off start command to the auxiliary lamp at timing suitable for a future vehicle body posture. Therefore, the lighting-off period of the auxiliary lamp is not increased excessively while the vehicle is turning, and it becomes possible to prevent, for example, the situation in which the person riding in the vehicle coming from the opposite direction is bothered by the glaring light emitted from the auxiliary lamp.

The above and further objects, features and advantages of the present invention will more fully be apparent from the following detailed description of preferred embodiment with reference to the accompanying drawings.

DETAILED DESCRIPTION OF THE EMBODIMENTS

Hereinafter, the embodiments of the present invention will be described with reference to the drawings. Throughout the drawings, the same or corresponding components are designated by the same reference symbols, and will not be described repeatedly. The stated directions are from the perspective of a rider straddling a motorcycle. A vehicle width direction of the vehicle body of the motorcycle corresponds with a rightward and leftward direction.

(Embodiment 1)

Figure 1:
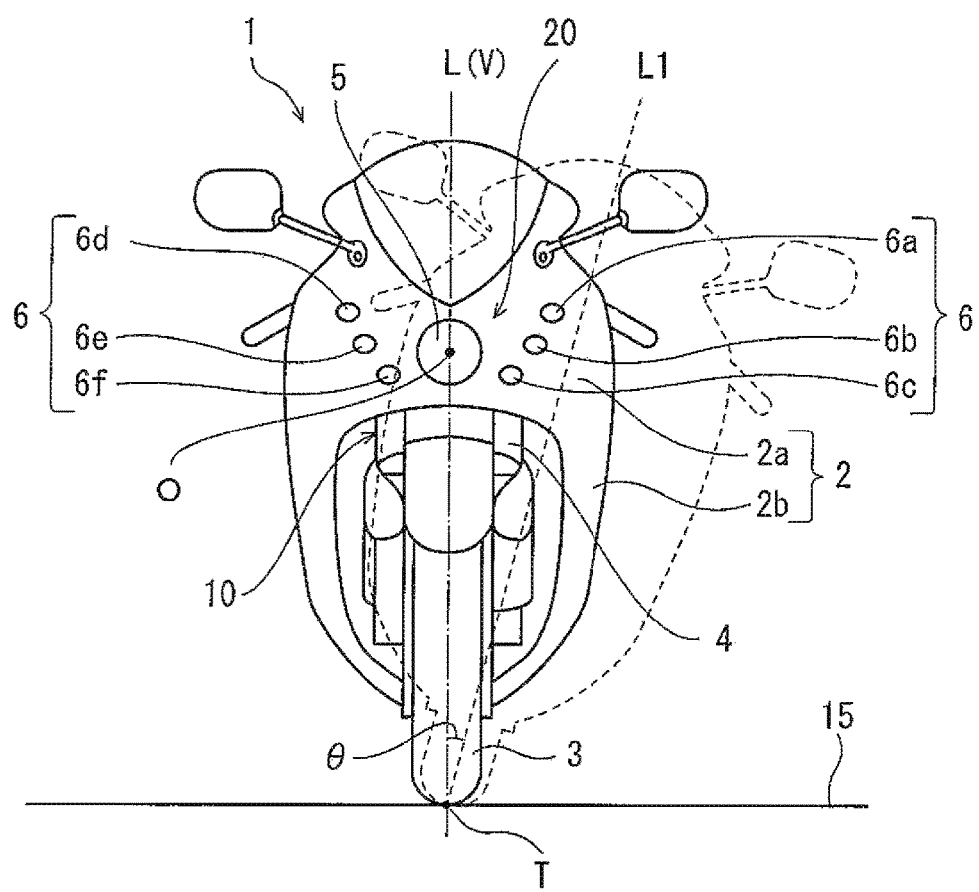
FIG. 1 is a front view of a motorcycle which is an exemplary vehicle according to Embodiment 1.

FIG. 1 is a front view of a motorcycle 1 according to Embodiment 1. As shown in FIG. 1, the motorcycle 1 includes a cowling 2 covering a vehicle body 10. The cowling 2 includes a front cowling 2a, and a side cowling 2b. A front fork 4 is rotatably coupled at a lower end portion thereof to a front wheel 3. The front cowling 2a covers the upper side of the front fork 4. The side cowling 2b is located rearward relative to the front cowling 2a and covers the vehicle body 10 from outer sides in the vehicle width direction.

A lamp 20 including a head lamp 5 and a plurality of auxiliary lamps 6 is attached to the front portion of the front cowling 2a. In the present embodiment, the head lamp 5 is a head lamp including a light emitting diode (LED) light source as a light source. The light source of the head lamp 5 is not limited to the LED light source, and may be a halogen lamp, a discharge lamp, etc.

The plurality of auxiliary lamps 6 are attached to the vehicle body 10 on the right and left sides of the head lamp 5 in the vehicle width direction. In the embodiment, as in the case of the head lamp 5, each of the plurality of auxiliary lamps 6 includes the LED light source (not shown). As in the case of the head lamp 5, the light source of each of the plurality of auxiliary lamps 6 may be a halogen lamp, a discharge lamp, etc. Note that the number of the light sources of each of the auxiliary lamps 6 is not limited and may be two or more.

In a case where the vehicle body 10 is banked from an upright state to a first side in the vehicle width direction, the auxiliary lamp 6 is lighted at a predetermined bank angle. On the other hand, in a case where the vehicle body 10 is tilted from the bank state toward the upright state, the auxiliary lamp 6 is turned off at a predetermined bank angle. A bank angle θ is defined as an angle formed between a vertical line V extending vertically from a contact point T of the front wheel 3 and the road surface 15, and a center line L of the vehicle body 10, extending in the direction perpendicular to the vehicle width direction, at the center of the vehicle body 10 in the vehicle width direction. Hereinafter, it is assumed that a direction in which the vehicle body 10 is banked from the upright state to the first side in the vehicle width direction will be referred to as a positive direction, and a direction in which the vehicle body 10 is tilted from the bank state toward the upright state will be referred to as a negative direction.

The plurality of auxiliary lamps 6 include a first auxiliary lamp 6a, a second auxiliary lamp 6b, and a third auxiliary lamp 6c which are disposed on the first side (in the present embodiment, on the left side from the perspective of the rider) in the vehicle width direction relative to the head lamp 5. The plurality of auxiliary lamps 6 further include a first auxiliary lamp 6d, a second auxiliary lamp 6e, and a third auxiliary lamp 6f which are disposed on a second side (in the present embodiment, on the right side from the perspective of the rider) in the vehicle width direction relative to the head lamp 5. The plurality of auxiliary lamps 6a to 6f have the same structure. Alternatively, the plurality of auxiliary lamps 6a to 6f may have different structures. The number of the auxiliary lamps 6 disposed on the first side in the vehicle width direction relative to the head lamp 5 is not limited to three, and is preferably two or more. Nonetheless, the number of the auxiliary lamps 6 disposed on the first side may be one.

The auxiliary lamps 6d to 6f, and the auxiliary lamps 6a to 6c are disposed to be symmetric in the rightward and leftward direction, with respect to the center line L of the vehicle body 10. Alternatively, the auxiliary lamps 6d to 6f, and the auxiliary lamps 6a to 6c may not be disposed to be symmetric in the rightward and leftward direction, with respect to the center line L.

The first auxiliary lamps 6a, 6d are upper auxiliary lamps, respectively. The second auxiliary lamps 6b, 6e are intermediate auxiliary lamps located below the first auxiliary lamps 6a, 6d, respectively. The third auxiliary lamps 6c, 6f are lower auxiliary lamps located below the second auxiliary lamps 6b, 6e, respectively. The layout of the first auxiliary lamps 6a, 6d, the second auxiliary lamps 6b, 6e, and the third auxiliary lamps 6c, 6f, shown in FIG. 1 is merely exemplary. Also, hereinafter, in a case where it is not necessary to distinguish the first auxiliary lamps 6a, 6d, the second auxiliary lamps 6b, 6e, and the third auxiliary lamps 6c, 6f from each other, these will be simply referred to as the auxiliary lamp(s) 6.

The lighting/lighting-off operations of the auxiliary lamps 6 are controlled depending on an event occurring in the motorcycle 1 (vehicle) while the motorcycle 1 is traveling. In the present embodiment, the lighting/lighting-off operations of the auxiliary lamps 6 are controlled according to the bank (tilting) state of the vehicle body 10. The phrase "the lighting/lighting-off operations of the auxiliary lamps 6 are controlled" means "a lighting control section 8b which will be described later controls the brightness of the light emitted from the auxiliary lamps 6 in the lighting states" as well as "the lighting control section 8b turns ON or OFF the auxiliary lamps 6."

The lamp 20 including the head lamp 5 and the auxiliary lamps 6 configured as described above is configured to irradiate a lamp irradiation region 40 set in a road surface 15 of a region that is in front of the vehicle body 10. The lamp irradiation region 40 includes a head lamp irradiation region 50 to be irradiated by the head lamp 5, and auxiliary lamp irradiation regions 60 to be irradiated by the auxiliary lamps 6.

In the present specification, the brightness of the light emitted from the auxiliary lamps 6 which irradiate the auxiliary lamp irradiation regions 60 is indicated by luminosity (luminous intensity) (cd, candela). Alternatively, the brightness of the light emitted from the auxiliary lamps 6 may be indicated by illuminance (lx, lux), flux of light (1m, lumen), or the like. Each of the auxiliary lamp irradiation regions 60 includes a maximum luminosity region (not shown) having luminosity which is 95% or higher and 100% or lower, of maximum luminosity in a light distribution of the auxiliary lamp irradiation region 60. The luminosity of the light emitted from each of the auxiliary lamps 6 is preferably set to a value which is equal to or higher than 300 cd. Specifically, the luminosity of the light with which the maximum luminosity region of the auxiliary lamp irradiation region 60 is irradiated is set to a value that is 300 cd or higher, and lower than the maximum luminosity of the light emitted from the head lamp 5.

Now, description will be given of the control for the lighting operations of the auxiliary lamps 6a to 6c in a case where the vehicle body 10 is banked to the first side (in the present embodiment, to the left from the perspective of the rider) in the vehicle width direction. The lighting operations of the auxiliary lamps 6d to 6f are the same as those of the auxiliary lamps 6a to 6c, and will not be described specifically.

Figure 2:
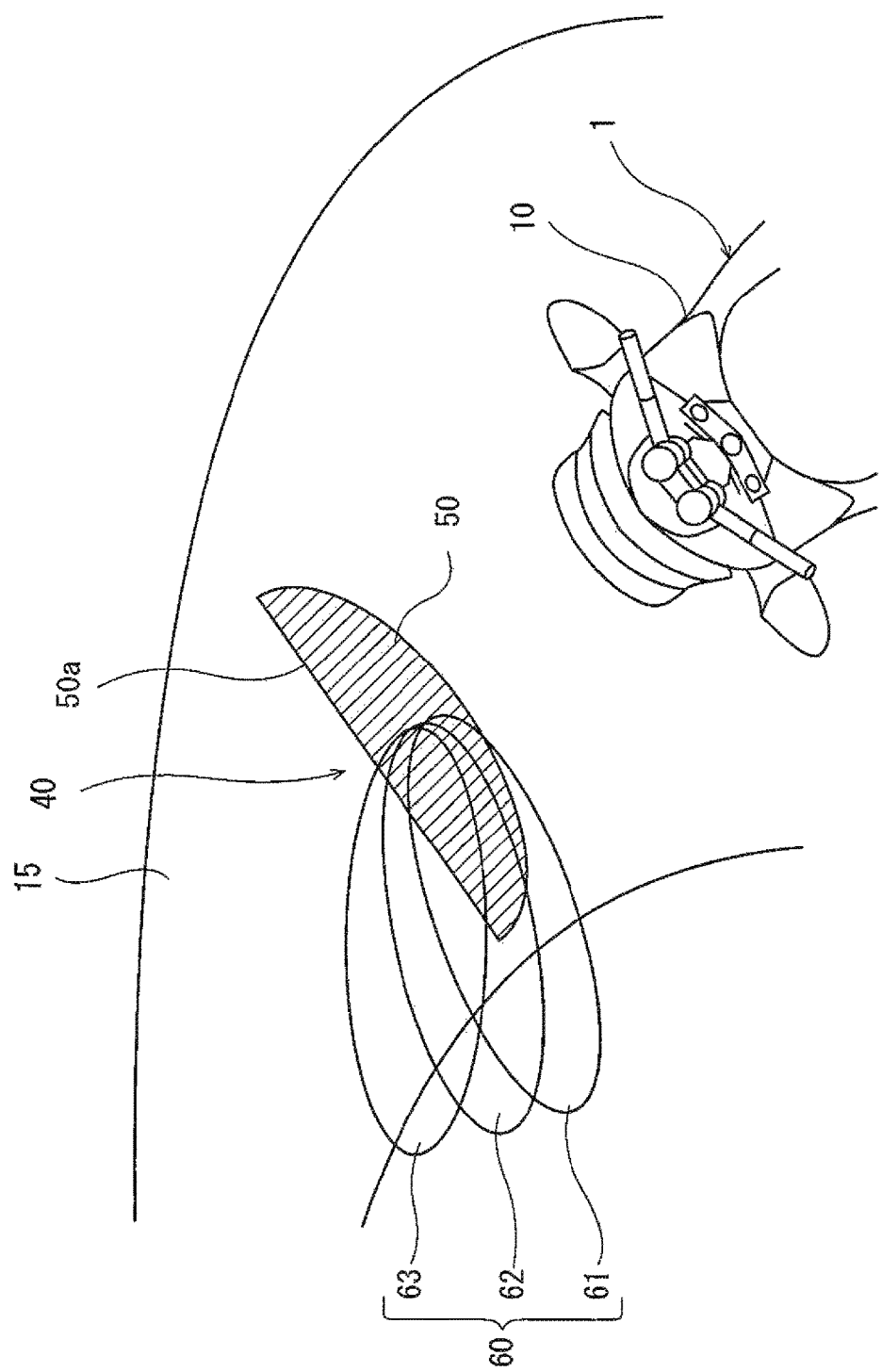
FIG. 2 is a schematic view showing the irradiation region of a head lamp and the irradiation regions of auxiliary lamps in a case where the motorcycle of FIG. 1 is turning.

FIG. 2 is a schematic view showing the irradiation region 50 of the head lamp 5 and the irradiation regions 60 of the auxiliary lamps 6 in a case where the motorcycle 1 is turning in a state in which the vehicle body 10 is banked to the first side in the vehicle width direction. As shown in FIG. 2, in a case where the motorcycle 1 is turning at, for example, a curve or an intersection in a state in which the vehicle body 10 is banked to the first side in the vehicle width direction, the head lamp 5 and the auxiliary lamps 6 are lighted to irradiate the head lamp irradiation region 50 and the auxiliary lamp irradiation regions 60. The head lamp irradiation region 50 includes a high beam irradiation region and a low beam irradiation region. According to the rider's operation, shifting between the high beam irradiation region and the low beam irradiation region is performed. Hereinafter, the low beam irradiation region will be referred to as the head lamp irradiation region 50.

The head lamp 5 forms a cut-off line 50a when the head lamp 5 is lighted. The cut-off line 50a is the line (light-dark boundary line) to cut a region to be irradiated in an upward direction, of the head lamp irradiation region 50, to prevent, for example, a situation in which a person riding in a vehicle coming from the opposite direction is bothered by the glaring light emitted from the auxiliary lamp 6. In a case where the vehicle body 10 is in the upright state, the cut-off line 50a extends linearly in the horizontal direction, in parallel with the vehicle width direction of the vehicle body 10. In a case where the vehicle body 10 is banked to the first side in the vehicle width direction, the cut-off line 50a of the head lamp irradiation region 50 is tilted to the first side in the vehicle width direction (lowered at the left from the perspective of the rider straddling the vehicle body 10).

The auxiliary lamp irradiation regions 60 to be irradiated by the auxiliary lamps 6 are set in the road surface 15 which is in front of the head lamp irradiation region 50 of the head lamp 5, on the first side in the vehicle width direction. The size of each of the auxiliary lamp irradiation regions 60 is smaller than that of the head lamp irradiation region 50. The auxiliary lamps 6a to 6c irradiate the auxiliary lamp irradiation regions 61 to 63 at predetermined set bank angles, respectively. The lamp irradiation region 40 changes as the auxiliary lamps 6a to 6c are lighted in succession. A state in which the vehicle body 10 is banked at a set bank angle will be referred to as a set bank state. When a bank state detecting section (described later) detects that the vehicle body 10 is in the set bank state, each of the auxiliary lamps 6 is lighted in a set lighting state. In other words, the set bank angle is a reference bank angle at which the auxiliary lamp 6 is lighted in the set lighting state, and a time point when the vehicle body 10 is banked at the set bank angle is the timing when the auxiliary lamp 6 starts to be lighted in the set lighting state (hereinafter this will also be referred to as lighting start timing).

The set bank angle is defined for each of the auxiliary lamps 6a to 6c. The set bank angles include a first set bank angle θ10, a second set bank angle θ20, and a third set bank angle θ30. The value of the second set bank angle θ20 is set to be larger than the value of the first set bank angle θ10. The value of the third set bank angle θ30 is set to be larger than the value of the second set bank angle θ20. Each of the auxiliary lamps 6a to 6c is attached to the vehicle body 10 in a state in which each of the auxiliary lamps 6a to 6c is tilted with respect to a horizontal plane according to the corresponding set bank angle. The values of the set bank angles will be described later. FIG. 2 shows a case where the motorcycle 1 is traveling in a state in which the vehicle body 10 is banked at the third set bank angle θ30, and all of the auxiliary lamps 6a to 6c are lighted (ON).

The second auxiliary lamp irradiation region 62 to be irradiated by the second auxiliary lamp 6b is set to be forward relative to the first auxiliary lamp irradiation region 61 to be irradiated by the first auxiliary lamp 6a lighted (turned on) first. The third auxiliary lamp irradiation region 63 to be irradiated by the third auxiliary lamp 6c is set to be forward relative to the second auxiliary lamp irradiation region 62 to be irradiated by the second auxiliary lamp 6b. Since the auxiliary lamps 6a to 6c irradiate the auxiliary lamp irradiation regions 61 to 63, respectively, the front region in the traveling direction, which cannot be irradiated by the head lamp 5 (the head lamp 5 and any of the auxiliary lamps 6a to 6c which have been ON), can be irradiated with the light (beam) emitted from the auxiliary lamp 6 which is lighted. This allows the rider to well see the road surface 15 of the front region in the traveling direction. Note that the auxiliary lamp irradiation regions 61 to 63 may be formed with cut-off lines, respectively, as in the case of the head lamp irradiation region 50.

Figure 3:
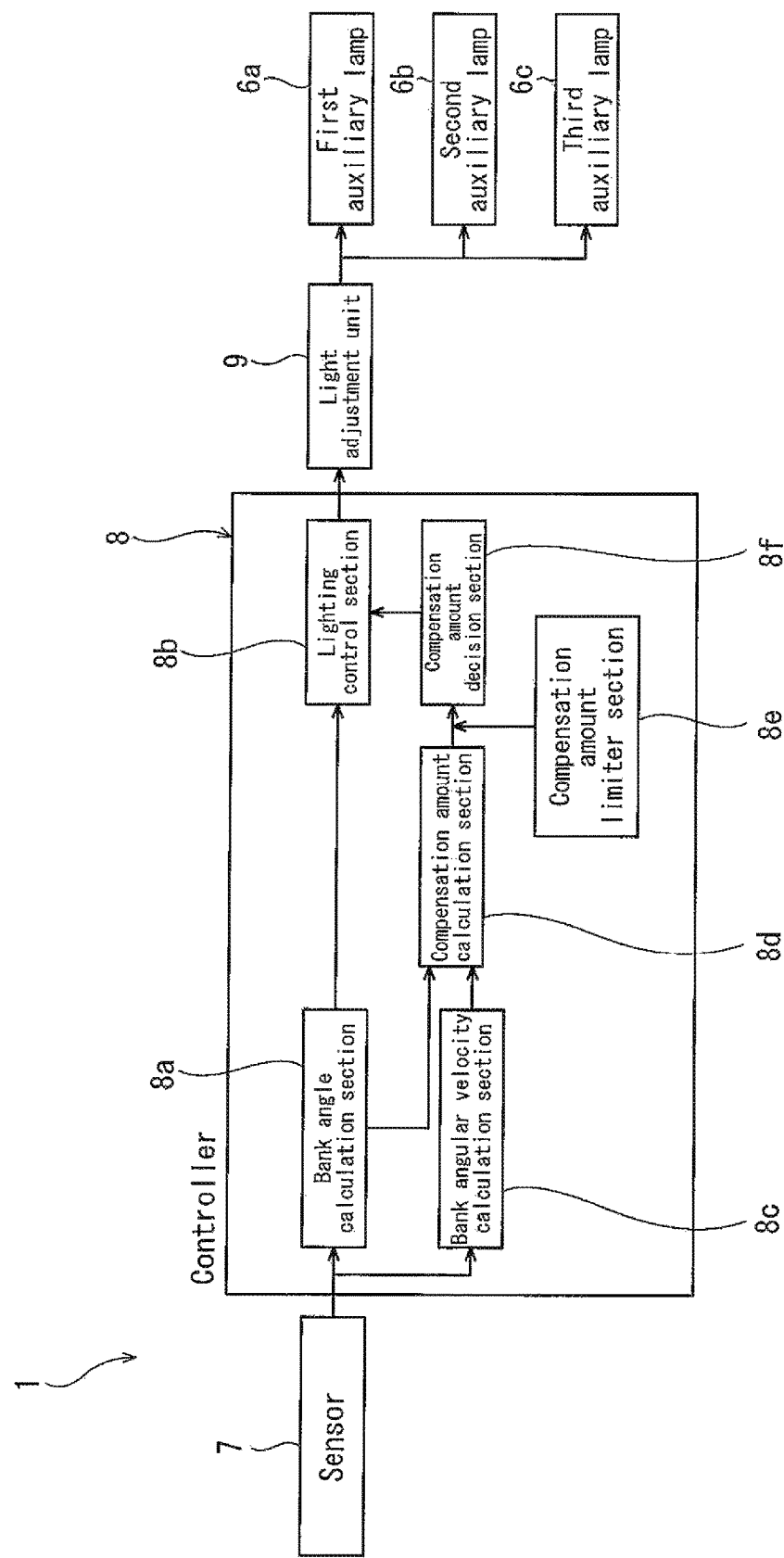
FIG. 3 is a block diagram showing a configuration for controlling the lighting/lighting-off operations of the auxiliary lamps of FIG. 1.

Next, a configuration for controlling the lighting operations of the auxiliary lamps 6 will be described. FIG. 3 is a block diagram showing a configuration for controlling the lighting operations of the auxiliary lamps 6 of FIG. 1. As shown in FIG. 3, the motorcycle 1 further includes a sensor 7, a controller 8, and a light adjustment unit 9. The sensor 7 is a bank (tilting) state detecting section which detects the bank (tilting) state of the vehicle body 10. Specifically, the sensor 7 detects a bank angular velocity around an axis (roll axis) of the vehicle body 10 extending in a forward and rearward direction, as the bank state of the vehicle body 10. The sensor 7 which functions as the bank state detecting section may be a sensor which detects a bank angle or a bank angular velocity. The sensor 7 is, for example, a gyro sensor.

The sensor 7 also functions as a detecting section which detects a change over time of the posture of the vehicle body 10 while the motorcycle 1 is traveling. The term "change over time of the posture of the vehicle body 10" means a change amount of the bank angle per unit time. In brief, the change over time of the posture of the vehicle body 10 is n-times temporal differentiation (n: natural number) of an angular change in the bank angle. In the present embodiment, the change over time of the posture of the vehicle body 10 is a bank angular velocity. Alternatively, the change over time of the posture of the vehicle body 10 may be a bank angular acceleration. The sensor 7 is electrically connected to the controller 8. Alternatively, the sensor 7 may be included in the controller 8.

The controller 8 includes a bank angle calculation section 8a, the lighting control section 8b, a bank angular velocity calculation section 8c, a compensation amount calculation section 8d, a compensation amount limiter section 8e, and a compensation amount decision section 8f. The bank angle calculation section 8a integrates the bank angular velocity output from the sensor 7 to calculate the bank angle θ. In the present embodiment, since the bank angle calculation section 8a integrates the bank angular velocity output from the sensor 7 to calculate the bank angle θ of the vehicle body 10, the bank angle detecting section for detecting the bank angle θ of the vehicle body 10 is constituted by the sensor 7 and the bank angle calculation section 8a. The value of the calculated bank angle θ is input to the lighting control section 8b.

The lighting control section 8b outputs to the light adjustment unit 9 a control signal used to control the lighting operation of each of the auxiliary lamps 6 based on the value of the bank angle θ. For example, when the bank angle θ of the vehicle body 10 reaches the set bank angle, the lighting control section 8b outputs to the light adjustment unit 9 a control signal for starting the lighting. The light adjustment unit 9 adjusts the luminosity of the light emitted from the auxiliary lamp 6 which increases/decreases per unit time, in response to the control signal received from the lighting control section 8b. Specifically, the light adjustment unit 9 adjusts the luminosity by controlling a current to be supplied to each of the auxiliary lamps 6. Alternatively, the light adjustment unit 9 may adjust the luminosity by changing a duty ratio (ON/OFF ratio) with respect to each of the auxiliary lamps 6. Further, the light adjustment unit 9 may be included in the controller 8 or each of the auxiliary lamps 6.

In the control for the lighting operations of the auxiliary lamps 6, there is a response time (time lag) which passes until the auxiliary lamp 6 starts to be lighted at predetermined luminosity. For example, the response time is a sum of a time lag which passes until the gyro sensor 7 outputs a detection signal to the bank angle calculation section 8a, time for which the bank angle calculation section 8a reads the signal output from the gyro sensor 7, time for which the lighting control section 8b outputs the control signal to the light adjustment unit 9, time for which the light source of the auxiliary lamp 6 is lighted at predetermined luminosity having been adjusted by the light adjustment unit 9, etc.

For example, in a case where the vehicle body 10 is quickly banked to the first side in the vehicle width direction while the motorcycle 1 is turning, the rider feels a lag in the lighting of the auxiliary lamp 6 due to the influence of the time lag in the lighting. In other words, if the vehicle body 10 is banked quickly, the timing at which the lamp irradiation region 40 starts to change is retarded. In view of this, in the present embodiment, the set bank angle of the lighting operation of the auxiliary lamp 6 is compensated based on the bank angular velocity which occurs when the vehicle body 10 is banked to the first side in the vehicle width direction. In other words, the timing at which the auxiliary lamp 6 starts to be lighted is changed based on the bank angular velocity. The phrase "the set bank angle of the lighting operation of the auxiliary lamp 6 is compensated" means that the auxiliary lamp 6 is lighted at suitable timing according to the bank angular velocity, and includes a case where a compensation amount is zero depending on the detected bank angular velocity.

In the present embodiment, to eliminate a lag in the lighting of the auxiliary lamp 6, the set bank angle is compensated to advance the timing at which the auxiliary lamp 6 starts to be lighted (to cause the auxiliary lamp 6 to start to be lighted at earlier time). Thus, the lighting state of the auxiliary lamp 6 is changed. Specifically, the value of the compensated set bank angle (hereinafter will be referred to as a compensated bank angle) is smaller than the value of the set bank angle which is uncompensated. The compensated bank angle is decided according to the following formula (1):

Compensated bank angle=Set bank angle−Compensation amount     formula (1)

The lighting control section 8b calculates the compensated bank angle according to the formula (1), and outputs a control signal to the auxiliary lamp 6 to cause the auxiliary lamp 6 to start to be lighted at the compensated bank angle. Thus, the lighting control section 8b functions as a control section for controlling the auxiliary lamp 6 so as to change the lamp irradiation region 40, based on the change over time of the posture of the vehicle body 10. Specifically, the lighting control section 8b decides the timing at which the auxiliary lamp 6 starts to be lighted based on the bank angular velocity, so as to change the lamp irradiation region 40.

Next, a configuration for deciding the compensation amount in the controller 8 will be described. The bank angular velocity calculation section 8c calculates a bank angular velocity which occurs in a period for which the vehicle body 10 changes from the upright state to the set bank state, based on a detection signal indicative of the bank angular velocity which is output from the gyro sensor 7. At this time, the vehicle body 10 is banked in the positive direction. Therefore, the value of the bank angular velocity output from the gyro sensor 7 is also a positive value. The bank angular velocity calculation section 8c outputs the calculated bank angular velocity to the compensation amount calculation section 8d.

In addition, the bank angle calculation section 8a outputs the calculated bank angle to the compensation amount calculation section 8d. For example, in a case where the vehicle body 10 is banked from the upright state at a small bank angle, the rider may quickly bank the vehicle body 10 to the first side in the vehicle width direction, thereafter (the bank angular velocity in the direction in which the vehicle body 10 is banked to the first side in the vehicle width direction, will increase, after the state in which the bank angle is small). In view of this, in the present embodiment, the compensation amount of the set bank angle is decided with reference to the value of the bank angle as well as the value of bank angular velocity.

The compensation amount calculation section 8d calculates a temporary compensation amount based on the bank angle calculated by the bank angle calculation section 8a, the bank angular velocity calculated by the bank angular velocity calculation section 8c, and the response time which passes until the auxiliary lamp 6 starts to be lighted. Specifically, the compensation amount calculation section 8d calculates the temporary compensation amount by multiplying the bank angular velocity by a coefficient, according to the following formula (2). For example, the coefficient is a value obtained by multiplying a predetermined value set according to a value of a present bank angle by the response time which passes until the auxiliary lamp 6 starts to be lighted. Predetermined time is stored in the compensation amount calculation section 8d as the response time.

$$\text{Temporary compensation amount} = \text{Bank angular velocity} \times \text{Coefficient} \quad \text{formula (2)}$$

Thus, the compensation amount of the set bank angle is calculated according to the formula (2) in which the change over time (bank angular velocity) of the posture of the vehicle body 10, and the bank angle are variables. The absolute value of the compensation amount of the set bank angle in a case where the change over time of the posture of the vehicle body 10 is a first change over time, and the bank angle is a first angle (e.g., 10 degrees) is set to be larger than the absolute value of the compensation amount of the set bank angle in a case where the change over time of the posture of the vehicle body 10 is a second change over time smaller than the first change over time, and the bank angle is a second angle (e.g., 30 degrees) larger than the first bank angle. Therefore, the compensation amount of the set bank angle is larger as the absolute value of the bank angular velocity in the direction in which the vehicle body 10 is banked to the first side in the vehicle width direction is larger, and the absolute value of the bank angle is smaller. The lighting control section 8b outputs to the light adjustment unit 9 a control signal for advancing the timing at which the auxiliary lamp 6 starts to be lighted (control signal for causing the auxiliary lamp 6 starts to be lighted at earlier time).

Although in the present embodiment, the compensation amount calculation section 8d is configured to calculate the temporary compensation amount of the set bank angle according to the formula, this configuration is exemplary. For example, a table containing a correspondence between the bank angular velocity (and the bank angle) and the compensation amount of the set bank angle may be stored in a memory, and the compensation amount of the set bank angle may be read from the table and used as the compensation amount of the set bank angle.

The compensation amount limiter section 8e is configured to limit the compensation amount of the set bank angle to a predetermined lower limit value or more, and a predetermined upper limit value or less. In the present embodiment, the upper limit value of the compensation amount of the set bank angle in the direction in which the vehicle body 10 is banked to the first side in the vehicle width direction is set to 3 degrees, while the lower limit value thereof is set to 0 degree. Instead of limiting the compensation amount of the set bank angle to the predetermined lower limit value or more, and the predetermined upper limit value or less, the compensation amount limiter section 8e may limit the compensated bank angle to a predetermined lower limit value or more, and a predetermined upper limit value or less.

Then, the compensation amount decision section 8f compares the temporary compensation amount calculated by the compensation amount calculation section 8d to the upper limit value and the lower limit value of the compensation amount limiter section 8e, and decides a proper compensation amount. Specifically, when the compensation amount decision section 8f determines that the temporary compensation amount is less than the lower limit value, it decides zero as the compensation amount of the set bank angle. In addition, the compensation amount decision section 8f determines whether or not the temporary compensation amount is more than the upper limit value, and decides the temporary compensation amount or the upper limit value as the compensation amount of the set bank angle. The compensation amount decision section 8f outputs the absolute value of the decided compensation amount to the lighting control section 8b.

Figure 4:
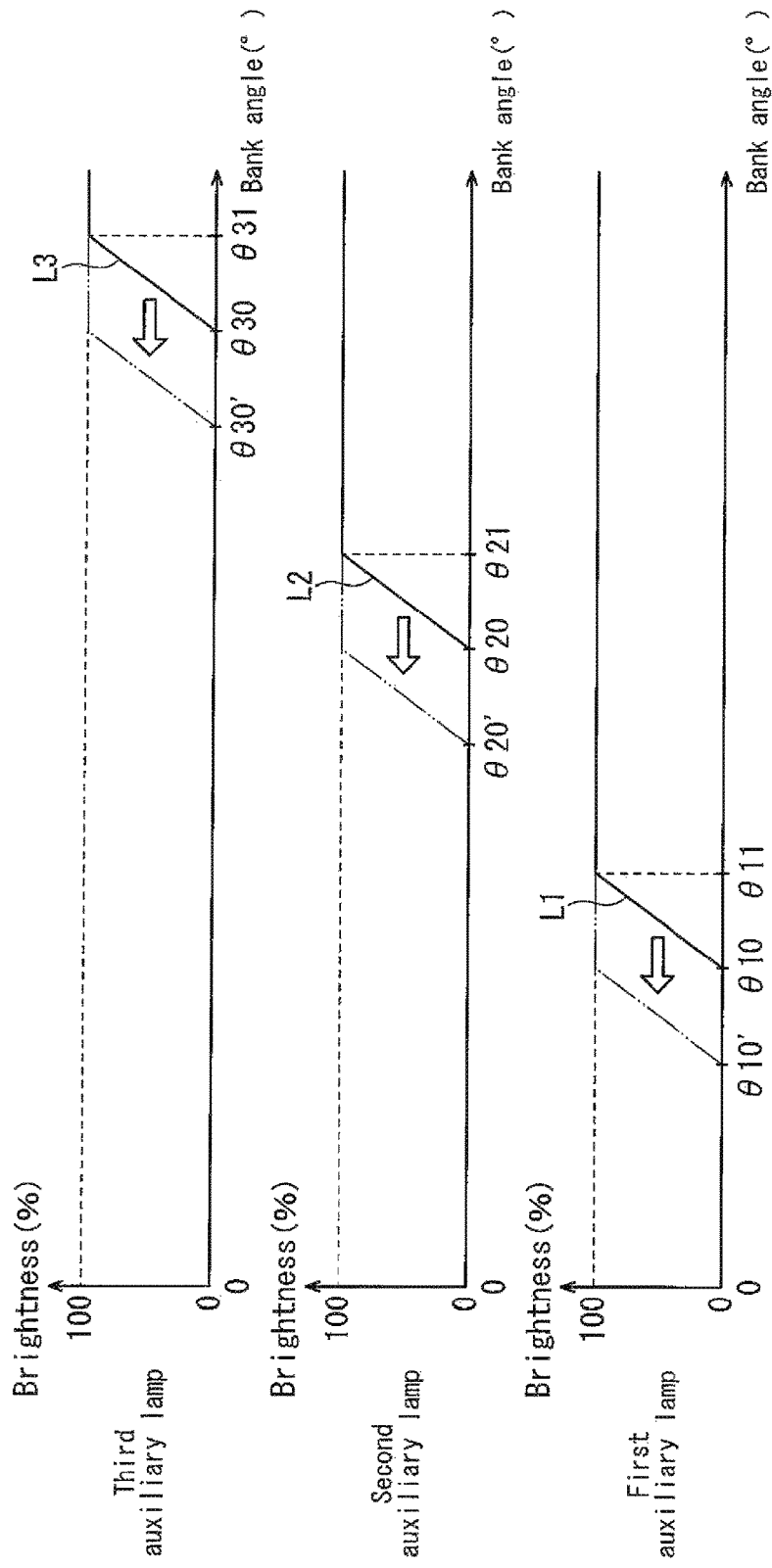
FIG. 4 is a schematic view showing an exemplary relationship between bank angles of a vehicle body and brightness of light emitted from the auxiliary lamps.

FIG. 4 is a view schematically showing an exemplary relationship between the bank angles of the vehicle body 10 and the brightness (luminosity) of the light emitted from the auxiliary lamps 6. In FIG. 4, a horizontal axis indicates the bank angle. The bank angle 0 degree indicates that the vehicle body 10 is in an upright state. A vertical axis indicates a ratio (percentage) of the luminosity of the light emitted from each of the auxiliary lamps 6 in a case where the vehicle body 10 is in a specified bank state with respect to the maximum luminosity of the light emitted from the auxiliary lamp 6.

In the present embodiment, for example, the first set bank angle θ10 is 10 degrees, the second set bank angle θ20 is 20 degrees, and the third set bank angle θ30 is 30 degrees.

When each of the auxiliary lamps 6 is in the set lighting state, the lighting control section 8b performs an initial control for gradually increasing the luminosity of the light emitted from the auxiliary lamp 6 with an increase in the degree of the bank angle from the timing when the auxiliary lamp 6 starts to be lighted (at the set bank angle).

Now, regarding the set lighting state of the auxiliary lamp 6 of the present embodiment, a first set lighting state L1 (see a solid line of FIG. 4) of the first auxiliary lamp 6a will be exemplarily described. When the vehicle body 10 is banked to an extent that the first set bank angle θ10 is calculated, the first auxiliary lamp 6a starts to be lighted. After that, when the vehicle body 10 is banked at a first lighting completion bank angle θ11, the brightness of the light emitted from the first auxiliary lamp 6a becomes 100%.

The lighting completion bank angle is defined as a bank angle at a time point when the luminosity of the light emitted from each of the auxiliary lamps 6 changes from a value less than the maximum luminosity in the set lighting state and reaches the maximum luminosity. The first auxiliary lamp 6a is lighted at the maximum luminosity when the vehicle body 10 is banked at the first lighting completion bank angle θ11. In the present embodiment, for example, the first lighting completion bank angle θ11 is 13 degrees. While the bank angle is in a range of 10 to 13 degrees, the brightness of the light is gradually increased in proportion to the bank angle. It should be noted that a change rate of the brightness (luminosity) of the light emitted from the first auxiliary lamp 6a with respect to the bank angle may be changed. In the present embodiment, for example, a second lighting completion bank angle θ21 is 23 degrees, and a third lighting completion bank angle θ31 is 33 degrees. At a bank angle larger than the lighting completion bank angle, each of the auxiliary lamps 6 continues to be lighted at the maximum luminosity.

Figure 5:
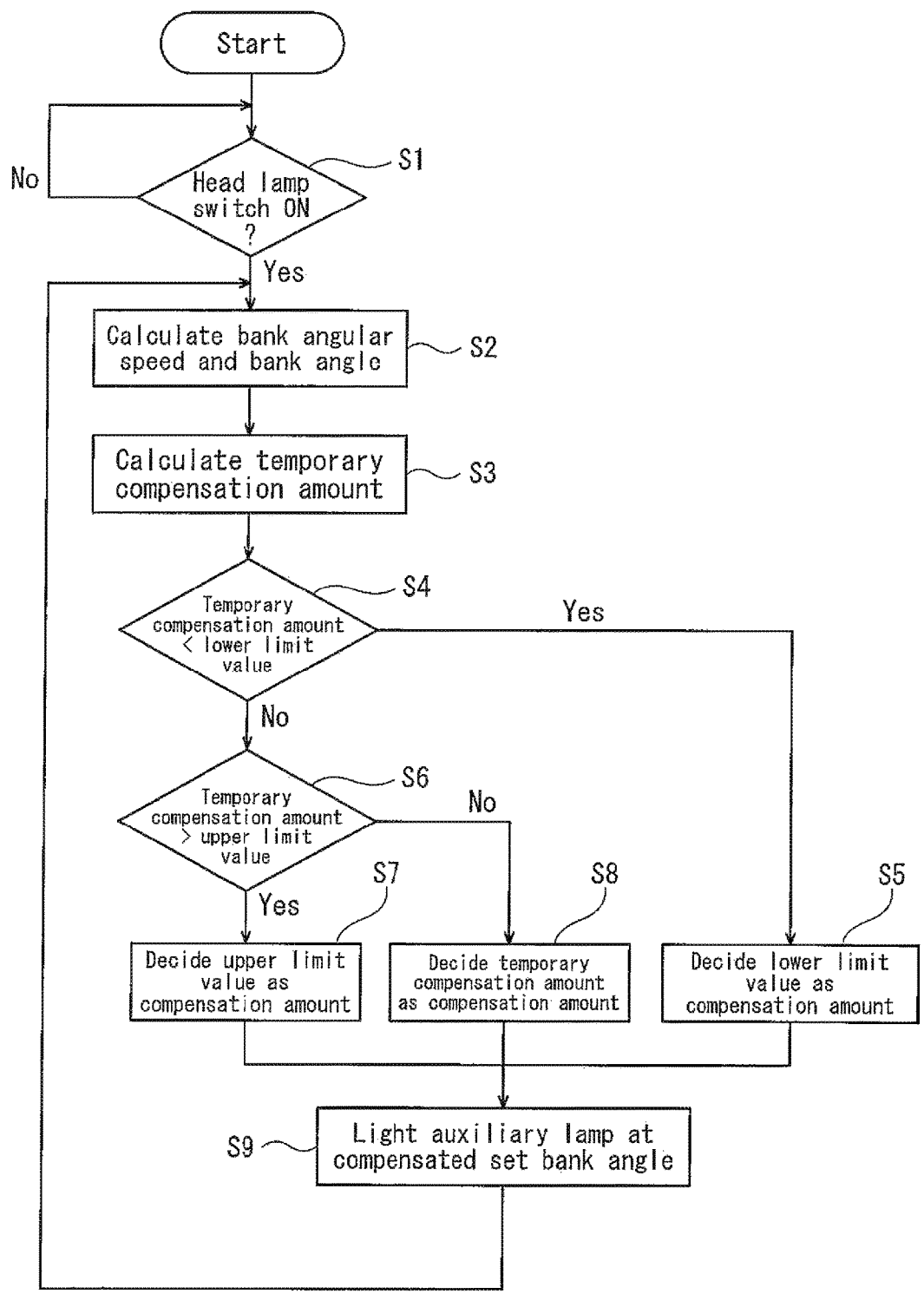
FIG. 5 is a flowchart showing a control for compensating a set bank angle in the lighting operation of each of the auxiliary lamps of FIG. 1.

FIG. 5 is a flowchart showing the control for compensating the set bank angle regarding the lighting operation of the auxiliary lamp 6. Now, with reference to FIGS. 4 and 5, a procedure for compensating the set bank angle and the lighting operation of the auxiliary lamp 6 after the set bank angle has been compensated. In the present embodiment, the first set bank angle, the second set bank angle, and the third set bank angle are compensated in this order. As shown in FIG. 5, initially, the controller 8 determines whether or not a head lamp switch has been turned on by the rider (step S1). The head lamp switch is a switch used to light (turn on) the head lamp 5. The head lamp switch of the motorcycle 1 is, for example, an ignition switch attached on the vehicle body 10. When the controller 8 determines that the ignition switch is ON in step S1 (Yes in step S1), the head lamp 5 is lighted (turned on).

Then, when the motorcycle 1 turns at a curve, an intersection, or the like, and the vehicle body 10 is banked to the first side in the vehicle width direction, the bank angular velocity calculation section 8c calculates the bank angular velocity and the bank angle calculation section 8a calculates the bank angle (step S2). Then, the compensation amount calculation section 8d calculates the temporary compensation amount of the set bank angle, according to the formula (2) (step S3). Then, the compensation amount decision section 8f determines whether or not the temporary compensation amount of the set bank angle is less than the lower limit value (step S4).

When the compensation amount decision section 8f determines that the temporary compensation amount of the set bank angle is less than the lower limit value in step S4 (Yes in step S4), it decides 0 degree which is the lower limit value, as the compensation amount of the first set bank angle θ10 (step S5). On the other hand, when the compensation amount decision section 8f determines that the temporary compensation amount of the set bank angle is equal to or more than the lower limit value in step S4 (No in step S4), it determines whether or not the temporary compensation amount of the set bank angle is more than the upper limit value (step S6). When the compensation amount decision section 8f determines that the temporary compensation amount of the set bank angle is more than the upper limit value in step S6 (Yes in step S6), it decides 3 degrees which is the upper limit value, as the compensation amount of the first set bank angle θ10 (step S7). On the other hand, when the compensation amount decision section 8f determines that the temporary compensation amount of the set bank angle is equal to or less than the upper limit value in step S6 (No in step S6), it decides the temporary compensation amount as the compensation amount of the first set bank angle θ10 (step S8).

Then, the lighting control section 8b compensates the first set bank angle θ10 to calculate a compensated bank angle θ10', based on the compensation amount decided in step S5, step S7 or step S8, and controls the first auxiliary lamp 6a in such a manner that the first auxiliary lamp 6a is lighted at the compensated bank angle θ10' (step S9). Although not shown in FIG. 5, the lighting completion bank angle is compensated in the same manner. In a specific example of the lighting operation of the first auxiliary lamp 6a, the value of the first set bank angle θ10 is compensated to be reduced (see an arrow of FIG. 4). In the present embodiment, it is assumed that regarding the lighting operation of the first auxiliary lamp 6a, 3 degrees which is the upper limit value is decided as the compensation amount of the first set bank angle θ10. In this case, the first set bank angle θ10 is compensated to become 7 degrees (see two-dotted line of FIG. 4), and the timing at which the set lighting state L1 of the first auxiliary lamp 6a starts is advanced.

After that, the controller 8 returns to step S2, and repeats step S2 to step S9 until the compensation of the third set bank angle θ30 is completed. In the middle of the flowchart of FIG. 5, if the rider turns off the ignition switch, the control for compensating the set bank angle is terminated.

The motorcycle 1 configured in the above-described manner can obtain advantages described below.

In the motorcycle 1 including the lamp 20 including the auxiliary lamps 6, the timing at which each of the auxiliary lamps 6 starts to be lighted is decided based on the bank angular velocity. This makes it possible to change the lamp irradiation region 40 by use of each of the auxiliary lamps 6 lighted at timing suitable for a future posture of the vehicle body 10. Therefore, the rider can well see the road surface 15 without excessively increasing the lighting period of the auxiliary lamps 6, while the motorcycle 1 is turning.

As the value of the bank angular velocity in the direction in which the vehicle body 10 is banked to the first side in the vehicle width direction increases, namely, when the bank state detecting section detects the posture of the vehicle body 10 in which the vehicle body 10 is quickly banked, the compensation amount of the set bank angle is increased to advance the timing at which the auxiliary lamp 6 starts to be lighted (to cause the auxiliary lamp 6 to start to be lighted at earlier time). This makes it possible to eliminate a lag in the lighting of the auxiliary lamp 6. Because of this, it becomes possible to prevent a situation in which the desired auxiliary lamp irradiation region 60 cannot be irradiated under a state in which the compensation amount of the set bank angle is not increased. Therefore, the rider can well see the road surface of the front region in the traveling direction (turning direction), which is distant from the vehicle body 10, while the motorcycle 1 is turning.

The lighting control section 8b decides the timing at which the auxiliary lamp 6 starts to be lighted, based on the bank angular velocity and the bank angle. Therefore, in a case where the vehicle body 10 is in a specified bank state, the timing at which the auxiliary lamp 6 starts to be lighted can be set accurately so that the auxiliary lamp 6 is lighted in a suitable lighting state. Since the compensation amount of the set bank angle is decided based on the bank angle in addition to the bank angular velocity, the compensation amount of the set bank angle can be decided based on the bank angular velocity predicted with reference to how the rider banks the vehicle body 10 while the motorcycle 1 is traveling.

In a case where the bank angular velocity is a positive value, namely, the vehicle body 10 is banked, and the bank angle is small, the rider may quickly bank the vehicle body 10 to the first side in the vehicle width direction, thereafter. Therefore, when the vehicle body 10 is banked at a first angle (e.g., 10 degrees) smaller than a second angle (e.g., 30 degrees), the compensation amount of the set bank angle is decided in view of the fact that the bank angular velocity in the direction in which the vehicle body 10 is banked will increase. By reducing the value of the set bank angle based on the compensation amount, the timing at which the auxiliary lamp 6 starts to be lighted can be advanced (the auxiliary lamp 6 starts to be lighted at earlier time).

In a case where the compensation amount of the set bank angle exceeds the upper limit value, a change in the lighting state of the auxiliary lamp 6 is limited. Thus, occurrence of an excess change in the lighting state can be prevented. Since a change in the lighting state of the auxiliary lamp 6 is limited, it becomes possible to prevent, for example, a situation in which the timing at which the auxiliary lamp 6 starts to be lighted is advanced excessively, and thereby a person riding in a vehicle coming from an opposite direction is bothered for a moment by glaring light emitted from the auxiliary lamp 6. In the present embodiment, the compensation amount decision section 8f decides as the compensation amount of the set bank angle, the temporary compensation amount calculated by the compensation amount calculation section 8d or the upper limit value set by the compensation amount limiter section 8e. This makes it possible to prevent a situation in which the set bank angle is compensated by the compensation amount which is more than the upper limit value.

In a case where the compensation amount of the set bank angle is less than the lower limit value, the lighting state of the auxiliary lamp 6 is limited. This makes it possible to prevent a change in the lighting state of the auxiliary lamp 6 in a case where the vehicle body 10 is gradually banked, and a change in the posture of the vehicle body 10 is less. Or, in a case where the bank angular velocity is lower or the bank angle is smaller, it becomes possible to prevent a situation in which the timing at which the auxiliary lamp 6 starts to be lighted is advanced excessively, and thereby the person riding in the vehicle coming from the opposite direction is bothered by glaring light emitted from the auxiliary lamp 6. In the present embodiment, when the compensation amount decision section 8f determines that the temporary compensation amount is less than the lower limit value, it decides zero as the compensation amount. In this case, since the compensation amount of the set bank angle is not compensated, a change in the lighting state of the auxiliary lamp 6 can be prevented.

The lighting control section 8b performs the initial control for gradually increasing the luminosity of the light emitted from the auxiliary lamp 6 with an increase in the degree of the bank angle from the timing at which the auxiliary lamp 6 starts to be lighted. In this way, when the auxiliary lamp 6 is lighted from the timing at which the auxiliary lamp 6 starts to be lighted, the luminosity of the light is gradually increased with an increase in the degree of the bank angle, and a rapid change in the luminosity of the light emitted from the auxiliary lamp 6 can be prevented. Therefore, the rider does not feel discomfort due to the lighting of the auxiliary lamp 6. Even if the timing at which the auxiliary lamp 6 starts to be lighted is advanced excessively, the luminosity of the light emitted from the auxiliary lamp 6 is gradually increased. Thus, it becomes possible to prevent, for example, a situation in which the person riding in the vehicle coming from the opposite direction is bothered by glaring light emitted from the auxiliary lamp 6.

(Embodiment 2)

In the motorcycle according to Embodiment 2, the control for the lighting operations of the auxiliary lamps 6 according to Embodiment 1 is modified. Hereinafter, regarding the control for the lighting operations of the auxiliary lamps 6 according to Embodiment 2, differences from the control for the lighting operations of the auxiliary lamps 6 according to Embodiment 1 will be described.

Figure 6A:
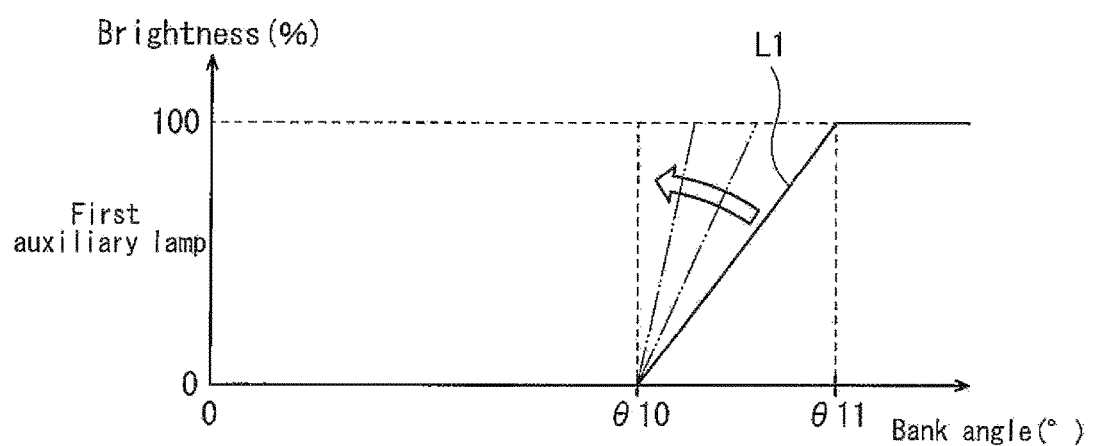
FIG. 6A is a view showing a control performed for the lighting operation of the auxiliary lamp according to Embodiment 2, corresponding to FIG. 4.

Hereinafter, a case where the control for the lighting operation according to Embodiment 2 is performed for the first auxiliary lamp 6a will described. FIG. 6A is a view showing the control performed for the lighting operation of the first auxiliary lamp 6a according to Embodiment 2, corresponding to FIG. 4. As shown in FIG. 6A, in Embodiment 2, the change rate of the luminosity of the light emitted from the first auxiliary lamp 6a, with respect to the bank angle, is changed based on the bank angular velocity. Specifically, the change rate of the luminosity of the light emitted from the first auxiliary lamp 6a with respect to the bank angle is increased so that the luminosity of the light emitted from the first auxiliary lamp 6a reaches the maximum luminosity at earlier time (see two-dotted line of FIG. 6A), as the bank angular velocity at which the vehicle body 10 is banked to the first side in the vehicle width direction increases, namely, when the bank state detecting section detects a vehicle body posture in which the vehicle body 10 is more quickly banked to the first side in the vehicle width direction. In this setting, the luminosity of the light emitted from the first auxiliary lamp 6a reaches the maximum luminosity at earlier time.

Figure 6B:
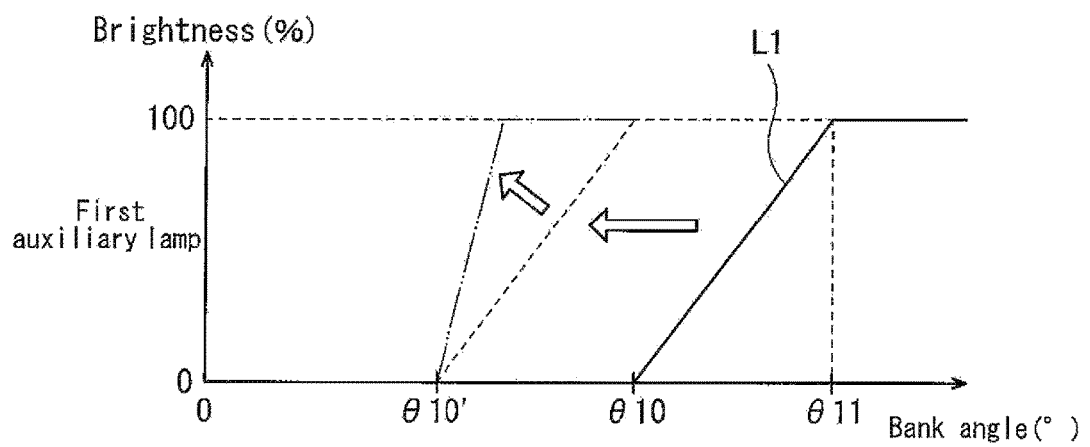
FIG. 6B is a view showing a modified example of Embodiment 2, corresponding to FIG. 4.

FIG. 6B is a view showing a modified example of Embodiment 2, corresponding to FIG. 4. As shown in FIG. 6B, after the first set bank angle θ10 has been compensated to be reduced by 3 degrees which is the upper limit value (see broken line of FIG. 6B), the change rate of the luminosity of the light emitted from the first auxiliary lamp 6a, with respect to the bank angle, may be increased, and the first lighting completion bank angle θ11 at which the luminosity of the light emitted from the first auxiliary lamp 6a reaches the maximum luminosity may be reduced (see two-dotted line of FIG. 6B). The change rate of the luminosity of the light emitted from the first auxiliary lamp 6a, with respect to the bank angle, namely, the lighting speed of the first auxiliary lamp 6a, can be changed by controlling the light adjustment unit 9 by the lighting control section 8b based on the bank angular velocity.

In Embodiment 2, the same advantages as those of Embodiment 1 can be obtained. Further, as the bank angular velocity in the direction in which the vehicle body 10 is banked to the first side in the vehicle width direction increases, the change rate of the luminosity of the light emitted from the auxiliary lamp 6, with respect to the bank angle, is increased. In this configuration, when the detecting section detects that the vehicle body 10 is quickly banked to the first side in the vehicle width direction, the change rate of the luminosity of the light emitted from the auxiliary lamp 6, with respect to the bank angle, is increased. This makes it possible to set the luminosity of the light emitted from the first auxiliary lamp 6 based on the bank angular velocity, while preventing a situation in which the rider feels discomfort due to a lag in the lighting of the auxiliary lamp 6.

Specifically, the lighting control section 8b controls the light adjustment unit 9 in such a manner that the lighting speed of the auxiliary lamp 6 is increased as the bank angular velocity increases, to change the timing at which the auxiliary lamp 6 reaches the maximum luminosity. Thus, the set bank angle is compensated, and the change rate of the luminosity of the light emitted from the auxiliary lamp 6 with respect to the bank angle is changed, based on the bank angular velocity. As a result, the suitable timing at which the auxiliary lamp 6 is lighted can be easily set.

In particular, in a case where the compensation amount decided by the compensation amount decision section 8f based on the value of the calculated bank angular velocity is the upper limit value, the timing at which the auxiliary lamp 6 is lighted at the maximum luminosity can be advanced more, by changing the change rate of the luminosity of the light emitted from the auxiliary lamp 6, with respect to the bank angle of the vehicle body 10, based on the bank angular velocity. This allows the rider to better see the auxiliary lamp irradiation region 60 irradiated at higher luminosity, in the front region in the traveling direction, which is distant from the vehicle body 10, when the vehicle body 10 is banked more quickly.

(Embodiment 3)

In the motorcycle according to Embodiment 3, the control for the lighting operations of the auxiliary lamps 6 according to Embodiment 1 is modified. Hereinafter, regarding the control for the lighting operations of the auxiliary lamps 6 according to Embodiment 3, differences from the control for the lighting operations of the auxiliary lamps 6 according to Embodiment 1 will be described.

In a case where the auxiliary lamp 6 starts to be lighted when the vehicle body 10 is banked at the set bank angle, the light is not emitted to the front region in the traveling direction before the auxiliary lamp 6 starts to be lighted. Or, in a case where the auxiliary lamp 6 is lighted abruptly at the set bank angle, the rider feels discomfort.

In the present embodiment, the lighting state of each of the auxiliary lamps 6 includes a preceding lighting state and a set lighting state which are different in luminosity depending on the value of the bank angle. The preceding lighting state is defined as a state in which each of the auxiliary lamps 6 is lighted at luminosity lower than that of the set lighting state, when the bank state detecting section detects a preceding bank state which occurs before the vehicle body 10 reaches the set bank state. The preceding bank state is defined as a state in which the vehicle body 10 is banked to an extent that a preceding bank angle smaller than the set bank angle is calculated. In the present embodiment, the auxiliary lamp 6 is lighted in the preceding lighting state, when the vehicle body 10 is in the preceding bank state which occurs before the vehicle body 10 reaches the set bank state.

Figure 7:
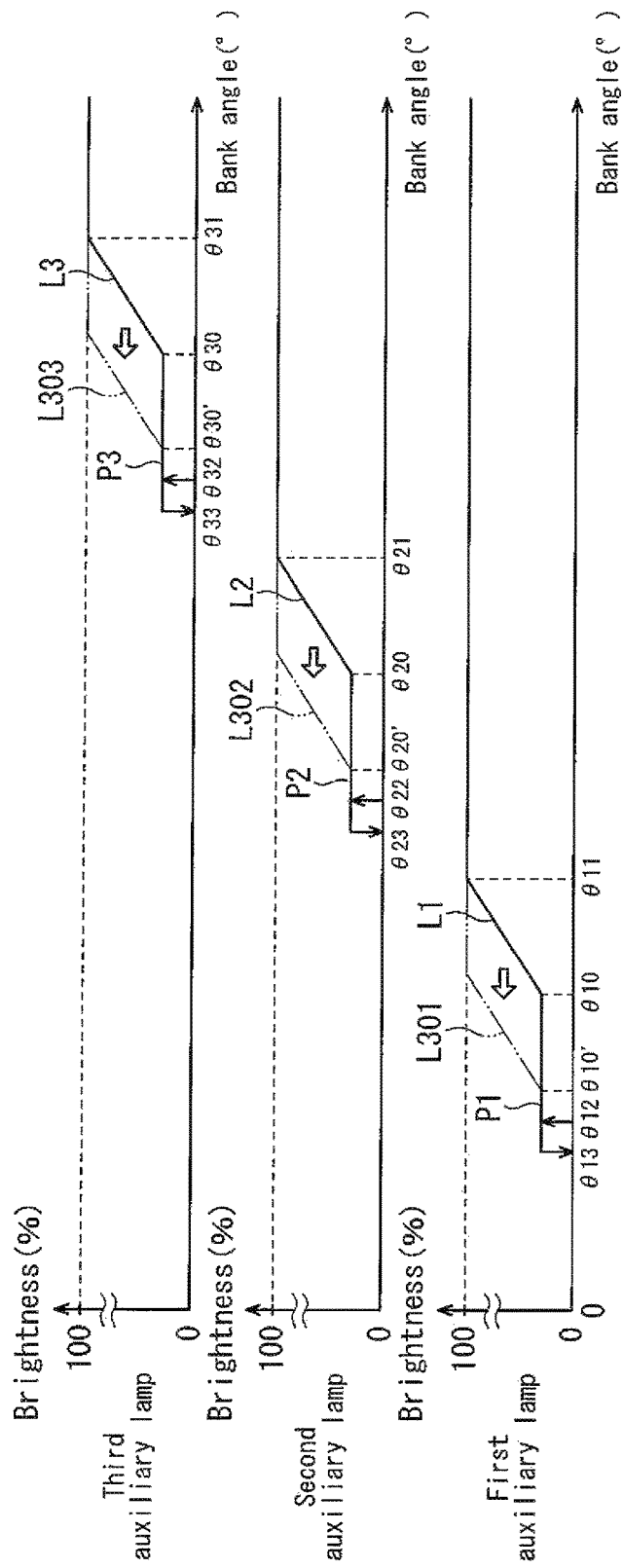
FIG. 7 is a view showing a control performed for the lighting operations of the auxiliary lamps according to Embodiment 3, corresponding to FIG. 4.

FIG. 7 is a view showing the control performed for the lighting operations of the auxiliary lamps 6 according to Embodiment 3, corresponding to FIG. 4. As shown in FIG. 7, when the bank state detecting section detects that the vehicle body 10 is banked to an extent that the preceding bank angle is calculated, each of the auxiliary lamps 6a to 6c is lighted in the corresponding one of the preceding lighting states P1 to P3. The preceding bank angle is a reference bank angle at which each of the auxiliary lamps 6a to 6c is in the corresponding one of the preceding lighting states P1 to P3. As in the case of the set bank angle, the preceding bank angle is defined for each of the auxiliary lamps 6a to 6c. In the present embodiment, the preceding bank angles include the first preceding bank angle $\theta12$, a second preceding bank angle $\theta22$, and a third preceding bank angle $\theta32$. Among the auxiliary lamps 6a to 6c, the first auxiliary lamp 6a is lighted (turned on) first. To prevent, for example, a situation in which the person riding in the vehicle coming from the opposite direction is bothered by glaring light emitted from the first auxiliary lamp 6a, the value of the first preceding bank angle $\theta12$ is preferably set to 5 degrees or larger.

Further, when the bank state detecting section detects a bank state (hereinafter this will be referred to as a lighting-off bank state) which has exited the preceding bank state, each of the auxiliary lamps 6a to 6c is turned off. The lighting-off bank state is defined as a state in which the vehicle body 10 is banked to an extent that a lighting-off bank angle is calculated. The lighting-off bank angle is a reference bank angle at which each of the auxiliary lamps 6 is turned off. The lighting-off bank angle is also defined for each of the auxiliary lamps 6a to 6c. In the present embodiment, the lighting-off bank angles include a first lighting-off bank angle $\theta13$, a second lighting-off bank angle $\theta23$, and a third lighting-off bank angle $\theta33$. In this way, the values of the preceding bank angles are set to be larger than the values of the lighting-off bank angles, respectively. Specifically, a degree of the bank angle in a case where the auxiliary lamp 6 is lighted (turned on) after the bank state detecting section detects that the bank state of the vehicle body 10 has reached the preceding bank state is larger than that in a case where the auxiliary lamp 6 is turned off after the bank state detecting section detects that the bank state of the vehicle body 10 has exited the preceding bank state.

Now, regarding the preceding lighting state of the present embodiment, the first preceding lighting state P1 of the first auxiliary lamp 6a will be exemplarily described. In the first preceding lighting state P1, when the vehicle body 10 is banked to an extent that the first preceding bank angle $\theta12$ (6 degrees) is calculated, the first auxiliary lamp 6a is lighted (turned on). The luminosity of the light emitted from the first auxiliary lamp 6a in the first preceding lighting state P1 is set to the value equal to or higher than 300 cd. Note that the luminosity of the light emitted from the first auxiliary lamp 6a in the first preceding lighting state P1 of FIG. 7 is merely exemplary, and may be lower than that of FIG. 7 so long as it is within the above range.

For a time period from when the first auxiliary lamp 6a is lighted (turned on) at the first preceding bank angle $\theta12$ until the first set bank angle $\theta10$ is calculated, namely, the vehicle body 10 reaches the first set bank state L1, the luminosity of the light emitted from the first auxiliary lamp 6a is constant. In the first preceding lighting state P1, when the vehicle body 10 is banked to an extent that the first lighting-off bank angle $\theta13$ (5 degrees) is calculated, the first auxiliary lamp 6a is turned off. In this way, in the first preceding lighting state P1, the first auxiliary lamp 6a is lighted at the constant luminosity, and therefore, it is not necessary to perform a control for changing the luminosity of the light emitted from the first auxiliary lamp 6a in proportion to the degree of the bank angle.

In the present embodiment, between the first set lighting state L1 and the second set lighting state L2, the second auxiliary lamp 6b is lighted in the second preceding lighting state P2, while between the second set lighting state L2 and the third set lighting state L3, the third auxiliary lamp 6c is lighted in the third preceding lighting state P3.

In Embodiment 3, the same advantages as those of the above-described embodiments can be obtained. In addition, when the vehicle body 10 is banked to the preceding bank state which occurs before the vehicle body 10 reaches the predetermined set bank state, the auxiliary lamp 6 is lighted in the preceding lighting state in which the luminosity of the light is lower than that of the set lighting state, to irradiate the auxiliary lamp irradiation region 60 of the front region in the traveling direction before the auxiliary lamp 6 reaches the set lighting state. As a result, it becomes possible to more effectively prevent the rider from feeling discomfort due to the lighting of the auxiliary lamp 6, while allowing the rider to better see the road surface 15 during the turning.

The auxiliary lamp 6 is first lighted in the preceding lighting state at luminosity lower than that of the set lighting state, and then shifts to the set lighting state. This makes it possible to reduce a change in the luminosity of the light emitted from the auxiliary lamp 6. Therefore, the seamless lighting of the auxiliary lamp 6 can be realized. As a result, it becomes possible to prevent a situation in which the auxiliary lamp 6 is lighted abruptly in the set lighting state, and thereby the rider feels discomfort.

Even in a case where some time is required to light each of the auxiliary lamps 6, due to the influences of a response time, the auxiliary lamp 6 can be lighted in the preceding lighting state at earlier time, before the set lighting state occurs.

The motorcycle 1 includes the plurality of auxiliary lamps 6a to 6c which become the set lighting states at different set bank angles, respectively. In the present embodiment, between the first set lighting state L1 and the second set lighting state L2, the second auxiliary lamp 6b is lighted in the second preceding lighting state P2, while between the second set lighting state L2 and the third set lighting state L3, the third auxiliary lamp 6c is lighted in the third preceding lighting state P3. In this way, it becomes possible to prevent a situation in which the plurality of auxiliary lamps 6a to 6c are lighted only in the set bank states, respectively, in a stepwise manner. As a result, the seamless lighting of the auxiliary lamp 6 can be realized, and the rider does not feel discomfort.

The bank angle of the vehicle body 10 in a case where the auxiliary lamp 6 is lighted after the vehicle body 10 has reached the preceding bank state is larger than that in a case where the auxiliary lamp 6 is turned off after the vehicle body 10 has exited the preceding bank state. In this way, since the auxiliary lamp 6 is lighted and turned off in different bank states of the vehicle body 10, a hysteresis can be set in the lighting operation of the auxiliary lamp 6. This makes it possible to prevent a situation in which the auxiliary lamp 6 is lighted and turned off in repetition, at a boundary between the state in which the auxiliary lamp 6 is lighted and the state in which the auxiliary lamp 6 is turned off.

The order in which the auxiliary lamps 6a to 6c are lighted is not limited to the above-described Embodiment 1 to Embodiment 3, and may be changed so long as the auxiliary lamp irradiation region 60 can be irradiated so as to irradiate the front region in the traveling direction with the light (beam) emitted from each of the auxiliary lamps 6a to 6c. Although in the above-described embodiments, in the set lighting states L1, L2, L3 of the auxiliary lamps 6a to 6c, the brightness of the light emitted from the auxiliary lamps 6a to 6c is increased in a straight-line in proportion to the bank angle of the vehicle body 10, it may be increased linearly in proportion to the bank angle of the vehicle body 10. Further, in the set lighting states L1, L2, L3 of the auxiliary lamps 6a to 6c, the luminosity of the light emitted from the auxiliary lamps 6a to 6c may be increased in a stepwise manner or in a curve line shape, in proportion of the bank angle.

(Embodiment 4)

In the motorcycle according to Embodiment 4, the control for the lighting/lighting-off operations of the auxiliary lamps 6 according to Embodiment 1 is modified. Hereinafter, regarding the control for the lighting/lighting-off operations of the auxiliary lamps 6 according to Embodiment 4, differences from the control for the lighting/lighting-off operations of the auxiliary lamps 6 according to Embodiment 1 will be described.

In the control performed for the lighting/lighting-off operations of the auxiliary lamps 6 according to Embodiment 4, the timing at which each of the auxiliary lamp 6 starts to be turned off is changed based on the bank angular velocity. In a case where the vehicle body 10 is tilted from the bank state toward the upright state, the auxiliary lamp 6 is turned off at a predetermined bank angle. In the present embodiment, in the lighting-off operation of the auxiliary lamp 6, the value of the lighting-off bank angle is equal to the value of the set bank angle in the lighting operation of the auxiliary lamp 6. The value of the bank angle at which the auxiliary lamp 6 starts to be turned off is equal to the value of the lighting completion bank angle in the lighting operation of the auxiliary lamp 6. As used herein, the bank angle at a time point when the luminosity of the light emitted from the auxiliary lamp 6 changes from the maximum luminosity to a value less than the maximum luminosity will be referred to as a lighting-off start bank angle.

As in the response time which passes until the auxiliary lamp 6 starts to be lighted (turned on), there is a time lag which passes until the auxiliary lamp 6 starts to be turned off. For example, in a case where the vehicle body 10 is quickly tilted from the bank state toward the upright state, for example, the person riding in the vehicle coming from the opposite direction may be bothered by the glaring light emitted from the auxiliary lamp 6, if the lighting-off of the auxiliary lamp 6 is retarded.

Figure 8:
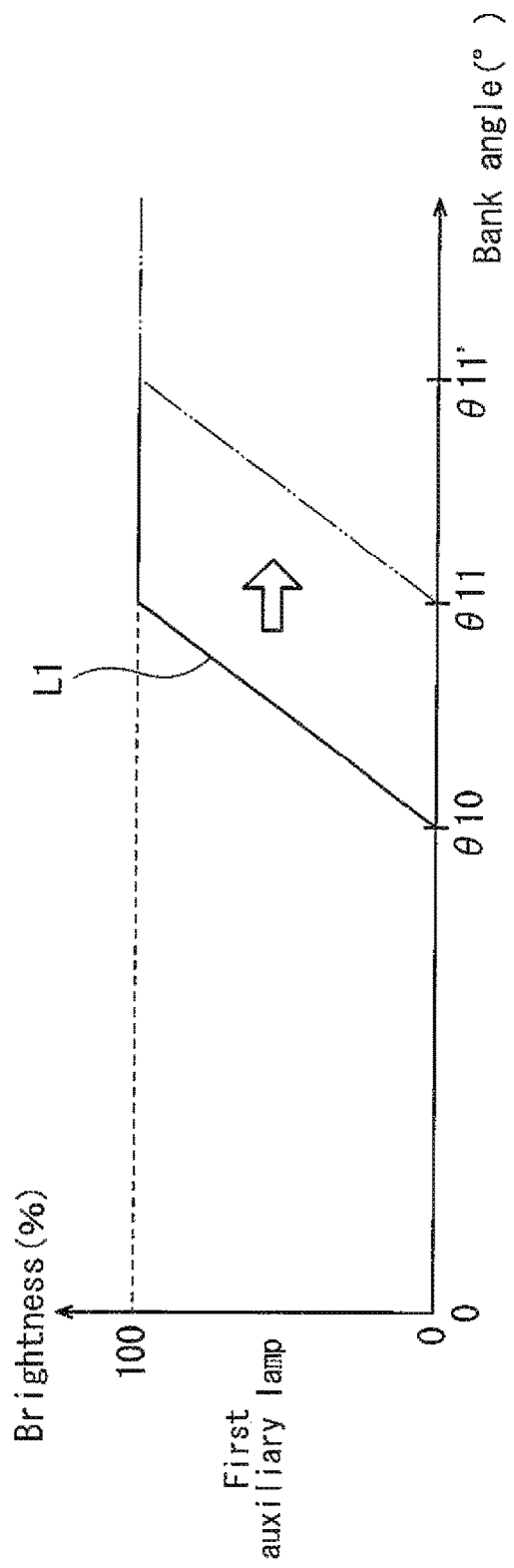
FIG. 8 is a view showing a control performed for the lighting-off operation of the auxiliary lamp according to Embodiment 4, corresponding to FIG. 4.

FIG. 8 is a view showing a control performed for the lighting-off operation of the auxiliary lamp 6 according to Embodiment 4, corresponding to FIG. 4. Hereinafter, a case where the control for the lighting-off operation according to Embodiment 4 is performed for the first auxiliary lamp 6a will be described. As shown in FIG. 8, in the lighting-off operation of the first auxiliary lamp 6a, the luminosity of the light emitted from the first auxiliary lamp 6a lighted at the maximum luminosity is gradually decreased until the vehicle body 10 reaches a first lighting-off bank angle θ10, after the first auxiliary lamp 6a starts to be turned off at a first lighting-off start bank angle θ11 of the vehicle body 10. Then, when the luminosity of the light emitted from the first auxiliary lamp 6a becomes 0 cd (brightness of the light is 0%) at the first lighting-off bank angle θ10, the first auxiliary lamp 6a is turned off (the first auxiliary lamp 6a ceases to be ON).

In the present embodiment, to eliminate a lag in the lighting-off of the auxiliary lamp 6, the lighting-off start bank angle is compensated to advance the timing at which the auxiliary lamp 6 starts to be turned off. Specifically, the value of a compensated lighting-off start bank angle θ11' (hereinafter this will be referred to as a compensated bank angle) is larger than the value of the lighting-off start bank angle θ11 which is uncompensated. The lighting-off start bank angle is decided according to the following formula (3). The compensated bank angle is a sum of the lighting-off start bank angle and a compensation amount.

$$\text{Compensated bank angle} = \text{lighting-off start bank angle} + \text{compensation amount} \quad (3)$$

The lighting control section 8b calculates the compensated bank angle according to the formula (3). After the lighting control section 8b has calculated the compensated bank angle, it outputs a control signal to the auxiliary lamp 6 to cause the auxiliary lamp 6 to start to be turned off at the compensated bank angle. Thus, the lighting control section 8b functions as a control section which decides the timing at which the auxiliary lamp 6 starts to be turned off, based on a change over time of the posture of the vehicle body 10 (in the present embodiment, bank angular velocity).

The compensation amount input to the lighting control section 8b is the absolute value of the compensation amount decided by the compensation amount decision section 8f The compensation amount decision section 8f compares the temporary compensation amount calculated according to the formula (2) to the limit value of the compensation amount limiter section 8e, and decides a proper compensation amount. In the present embodiment, since the vehicle body 10 is tilted in the negative direction, the calculated bank angular velocity is a negative value. A coefficient of the formula (2) is set to advance the timing at which the auxiliary lamp 6 starts to be turned off with an increase in the bank angle in a case where the vehicle body 10 is tilted in the negative direction. More specifically, the coefficient of the formula (2) is set so that the absolute value of the compensation amount corresponding to the second angle (e.g., 30 degrees) of the bank angle is larger than the absolute value of the compensation amount corresponding to the first angle (e.g., 10 degrees) of the bank angle, in a case where the bank angular velocity is the negative value.

After the lighting-off start bank angle of the auxiliary lamp 6 has been compensated, the timing at which the first auxiliary lamp 6a starts to be turned off is changed based on the compensation amount decided by the compensation amount decision section 8f, in the lighting-off operation of the first auxiliary lamp 6a. Specifically, in the lighting-off operation of the first auxiliary lamp 6a, the value of the lighting-off start bank angle is compensated to be increased (see arrow of FIG. 8). In the example of FIG. 8, in the lighting-off operation of the first auxiliary lamp 6a, the compensation amount of the first lighting-off start bank angle θ11 is decided by the compensation amount decision section 8f using 3 degrees which is the upper limit value. In this case, in the lighting-off operation of the first auxiliary lamp 6a, the first lighting-off start bank angle θ11 is compensated to be increased by 3 degrees which is the upper limit value (see two-dotted line of FIG. 8). In this setting, the timing at which the first auxiliary lamp 6a starts to be turned off is advanced. In this case, the first lighting-off bank angle θ10 is also compensated in the same manner, and the timing at which the first auxiliary lamp 6a is turned off (the first auxiliary lamp 6a ceases to be ON) is advanced.

By performing the above-described control for the lighting-off operation of the auxiliary lamp 6 according to Embodiment 4, the following advantages can be obtained.

Since the timing at which the auxiliary lamp 6 starts to be turned off is decided based on the bank angular velocity, it becomes possible to provide a lighting-off start command to the auxiliary lamp 6 at timing suitable for a future posture of the vehicle body 10. Therefore, the lighting-off period of the auxiliary lamp 6 is not increased excessively while the motorcycle 1 is turning, and it becomes possible to prevent, for example, the situation in which the person riding in the vehicle coming from the opposite direction is bothered by the glaring light emitted from the auxiliary lamp 6.

In a case where the vehicle body 10 is quickly tilted from the bank state toward the upright state, the timing at which the auxiliary lamp 6 starts to be turned off is advanced by increasing the compensation amount in such a manner that the value of the lighting-off start bank angle is increased. This makes it possible to prevent a situation in which the auxiliary lamp 6 continues to be lighted at the lighting-off start bank angle under a state in which the compensation amount of the bank angle is not increased, due to a lag in the lighting-off of the auxiliary lamp 6, and thereby the person riding in the vehicle coming from the opposite direction is bothered by the glaring light emitted from the auxiliary lamp 6.

Since the timing at which the auxiliary lamp 6 starts to be turned off is decided based on the bank angle in addition to the bank angular velocity, it becomes possible to accurately set the timing at which the auxiliary lamp 6 starts to be turned off so that the auxiliary lamp 6 is turned off in a suitable lighting-off state, in a case where the vehicle body 10 is in a specified bank state. Since the compensation amount of the set bank angle is decided based on the bank angle in addition to the bank angular velocity, the compensation amount of the set bank angle can be decided based on the bank angular velocity predicted with reference to how the rider banks the vehicle body 10 while the motorcycle 1 is turning.

In a case where the vehicle body 10 is tilted from the bank state in which the bank angle is large, toward the upright state, the rider may quickly tilt the vehicle body 10 toward the upright state. In view of this, in a case where the vehicle body 10 is banked at the second angle (e.g., 30 degrees) larger than the first angle (e.g., 10 degrees), the compensation amount is decided in view of an increase in the bank angular velocity in the direction in which the vehicle body 10 is tilted toward the upright state, and the value of the lighting-off start bank angle is increased. In this way, the timing at which the auxiliary lamp 6 starts to be turned off can be advanced.

(Embodiment 5)

A lamp 520 of a motorcycle 501 according to Embodiment 5 is different from the lamp 20 according to Embodiment 1 in that the lamp 520 does not include an auxiliary lamp and includes only a head lamp 505 and a lamp irradiation region 540 includes only a head lamp irradiation region 550. Hereinafter, regarding the control for the lighting operation of the lamp 520 according to Embodiment 5, differences from Embodiment 1 will be described.

Figure 9:
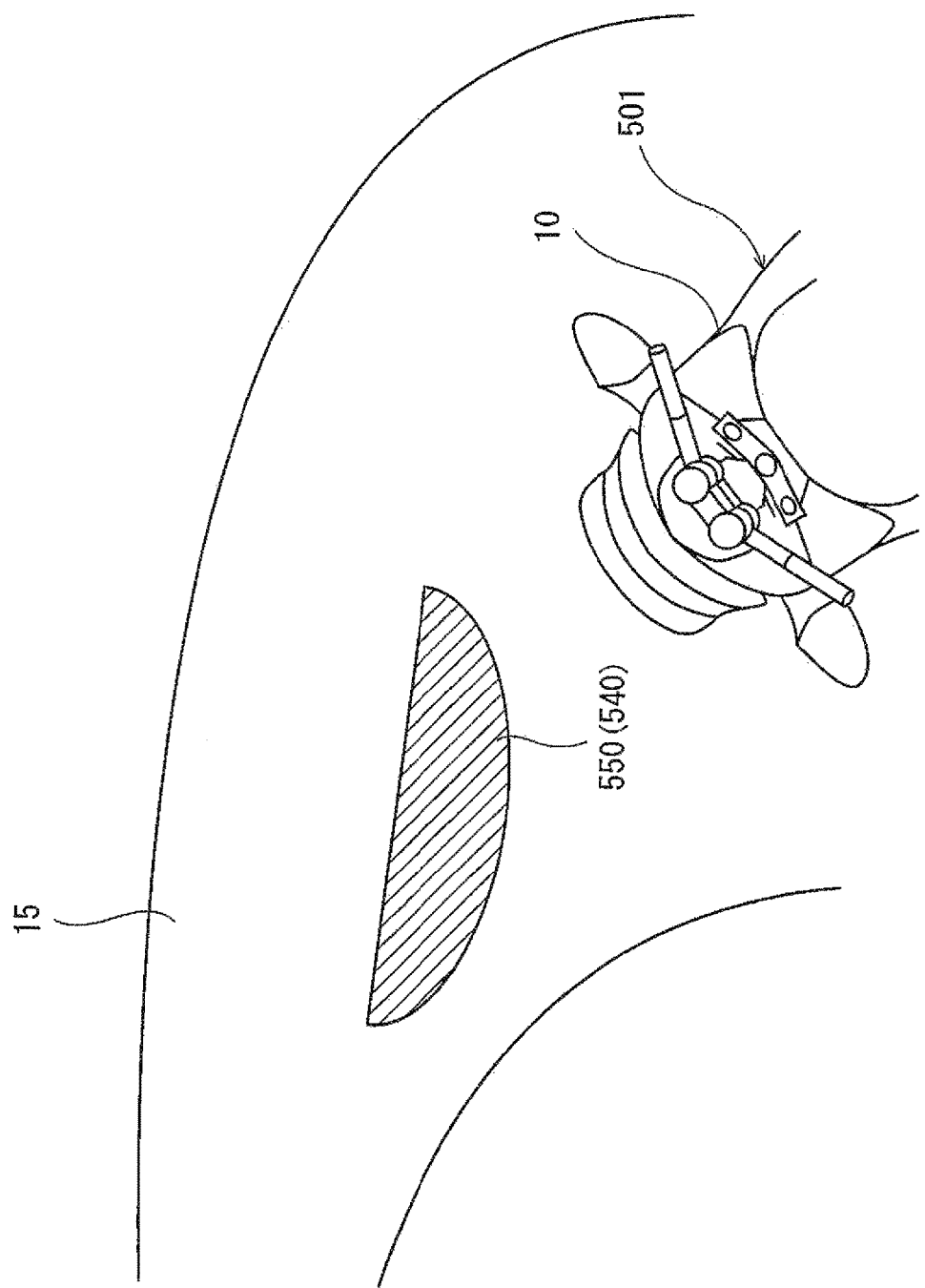
FIG. 9 is a schematic view showing a head lamp irradiation region in a case where a motorcycle according to Embodiment 5 is turning.

FIG. 9 is a schematic view showing the head lamp irradiation region 550 in a case where the motorcycle 501 according to Embodiment 5 is turning. In the present embodiment, as shown in FIG. 9, in a case where the motorcycle 501 is turning at a curve in a state in which the vehicle body 10 is banked to the left, the head lamp irradiation region 550 rotated in a direction (in this example, to the right (clockwise direction)) opposite to the direction in which the vehicle body 10 is banked is irradiated with the light emitted from the head lamp 505. This allows the rider to well see the road surface of the front region in the traveling direction while the motorcycle 501 is turning.

Figure 10:
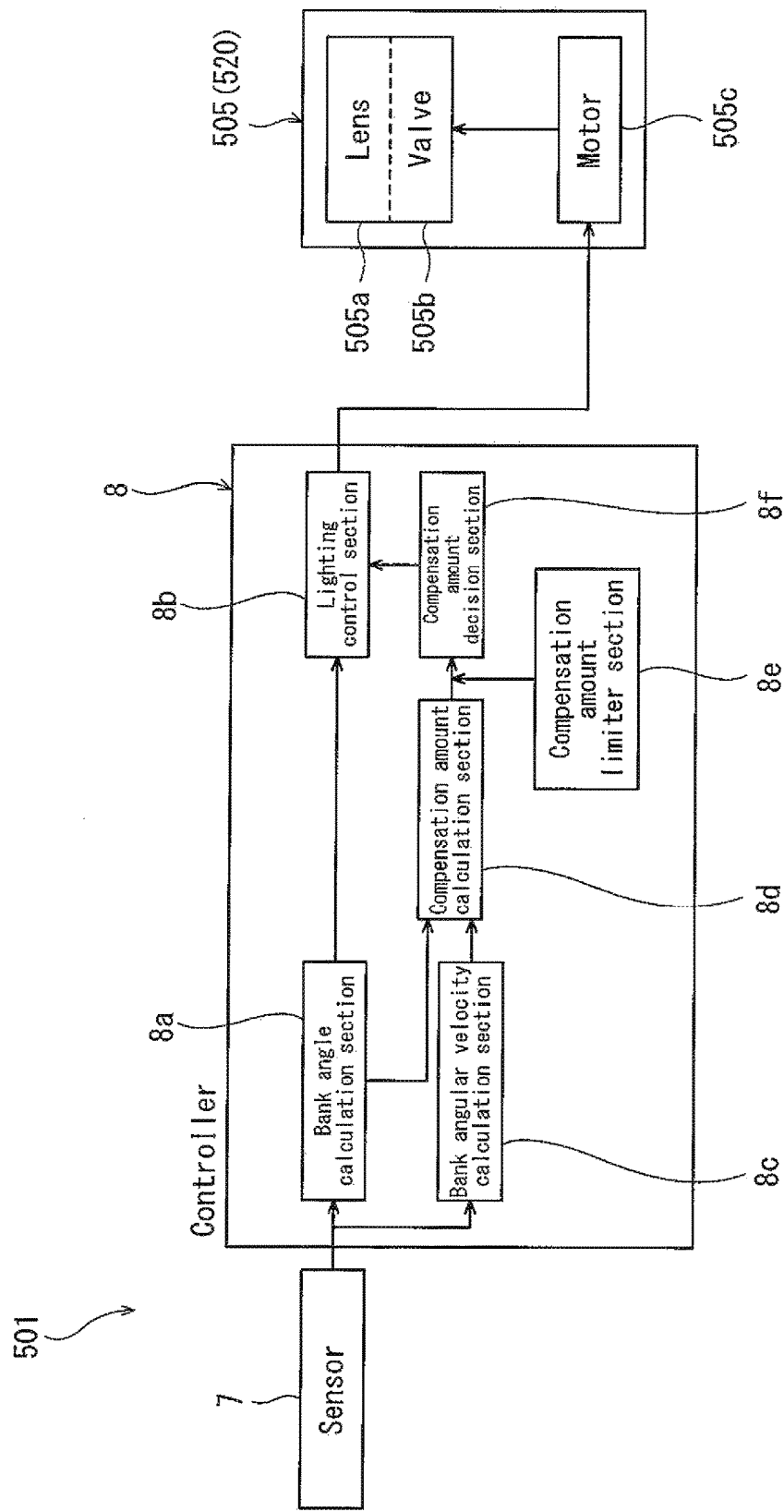
FIG. 10 is a block diagram showing a configuration for controlling the lighting operation of the head lamp according to Embodiment 5.

FIG. 10 is a block diagram showing a configuration for controlling the lighting operation of the head lamp 505 according to Embodiment 5. As shown in FIG. 10, the head lamp 505 includes a lens 505a, a valve 505b which is a light emitting element, and a motor 505c which rotates the lens 505a and the valve 505b. The lighting control section 8b of the controller 8 outputs a control signal used to control the motor 505c, based on the value of a bank angle θ. For example, when the bank angle θ reaches the value of the set bank angle, the lighting control section 8b outputs a drive signal to the motor 505c. In response to the drive signal, the motor 505c is actuated and a driving force of the motor 505c is transmitted to the lens 505a and the valve 505b. Thereby, the lens 505a and the valve 505b are rotated in a direction opposite to the direction in which the vehicle body 10 is banked. As a result, in a state in which the vehicle body 10 is banked to the left (in a counterclockwise direction in a rear view), the head lamp irradiation region 550 is rotated from an upright state to the right (in a clockwise direction in a rear view).

In the present embodiment, to eliminate a lag in the lighting of the head lamp 505, the head lamp irradiation region 550 is changed by compensating the set bank angle based on the bank angular velocity and the bank angle. For example, with an increase in the value of the bank angular velocity, the compensation amount of the set bank angle is increased to advance the timing at which the head lamp irradiation region 550 starts to be changed. Specifically, as the vehicle body 10 is banked quickly, the lighting control section 8b outputs a control signal to the motor 505c to advance the timing at which the motor 505c starts to be actuated, thereby advancing the timing at which the lens 505a and the valve 505b are rotated. In other respect, the configuration of Embodiment 5 is the same as that of Embodiment 1.

In Embodiment 5, the same advantages as those of the above-described embodiments can be obtained. Since the head lamp irradiation region 550 is rotated based on the bank angular velocity, the head lamp 505 can irradiate the head lamp irradiation region 550 suitable for a future vehicle body posture. This makes it possible to prevent, for example, the situation in which the timing at which the head lamp irradiation region 550 starts to be changed is merely advanced and the person riding in the vehicle coming from the opposite direction is bothered by the glaring light, while allowing the rider to well see the road surface during the turning.

The present invention is not limited to the above-described embodiments. The above-described configurations may be changed, added to or deleted from, within a scope of the preset invention. The above-described embodiments may be combined. For example, a part of the configuration of one embodiment may be applied to the other embodiments. Also, a part of the configuration of one embodiment may be separated from the configuration of this embodiment and extracted. For example, in the motorcycle 1 including the auxiliary lamp 6, the auxiliary lamp 6 may be controlled to eliminate a lag in the lighting of the auxiliary lamp 6 and a lag in the lighting-off of the auxiliary lamp 6.

Although in the above-described embodiments, the temporary compensation amount of the set bank angle is calculated according to the formula (2), this calculation method is merely exemplary, and the temporary compensation amount may be calculated according to the following formula (4).

$$\text{Temporary compensation amount} = \text{Bank angular velocity} + \text{Coefficient} \quad \text{formula (4)}$$

The coefficient is a value set based on the value of the bank angle. In other words, in the formula (4), the temporary compensation amount of the set bank angle may be calculated as a unit of the bank angular velocity. In this case, the compensation amount decision section 8f or the lighting control section 8b decides a final compensation amount by multiplying the temporary compensation amount by a specified response time that passes until the auxiliary lamp 6 is lighted or turned off. In a case where the temporary compensation amount is calculated according to the formula (4), the compensation amount limiter section 8e limits the bank angular velocity to a predetermined lower limit value or more and a predetermined upper limit value or less in deciding the final compensation amount.

Although in the above-described embodiments, the bank angular velocity is exemplarily described as the change over time of the vehicle body posture which occurs while the motorcycle 1 is traveling, and the timing at which the auxiliary lamp 6 starts to be lighted or the timing at which the auxiliary lamp 6 starts to be turned off is decided according to the bank angular velocity, this is merely exemplary, so long as the timing at which the auxiliary lamp 6 starts to be lighted or the timing at which the auxiliary lamp 6 starts to be turned off can be decided by another change over time of the vehicle body posture. For example, when the motorcycle 1 is going to just enter a curve or an intersection, the motorcycle 1 is decelerated, and thereby the posture of the vehicle body 10 is changed in such a manner that the front portion of the vehicle body 10 is lowered. In contrast, after the motorcycle 1 has entered the curve or the intersection, the motorcycle 1 is gradually accelerated as it approaches the exit of the curve or the intersection, and thereby the posture of the vehicle body 10 is changed in such a manner that the front portion of the vehicle body 10 is raised. The controller 8 may determine whether or not the motorcycle 1 is going to just enter the curve or the intersection, or whether or not the motorcycle 1 is approaching the exit of the curve or the intersection, by detecting a change in the posture of the vehicle body 10 which is caused by a pitching motion of the vehicle body 10, as the change over time of the vehicle body 10 during the traveling. Based on the determination, the controller 8 may change the timing at which the auxiliary lamp 6 starts to be lighted or the timing at which the auxiliary lamp 6 starts to be turned off.

Specifically, a gyro sensor around the axis (pitching axis) of the vehicle body 10 extending in the rightward and leftward direction may be provided as a detecting section which detects the change over time of the vehicle body posture. The detecting section may detect a pitching acceleration (acceleration rate) of the pitching motion of the vehicle body 10. Based on this, the controller 8 may determine whether or not the motorcycle 1 is going to just enter the curve or the intersection, or whether or not the motorcycle 1 is approaching the exit of the curve or the intersection. To detect the pitching acceleration, an acceleration sensor for detecting a vertical acceleration of the front portion of the vehicle body 10 may be provided, or a sensor for detecting a stroke displacement amount of a front suspension (or a rear suspension) may be provided.

In a case where the detecting section detects that the posture of the vehicle body 10 has been changed in such a manner that the front portion of the vehicle body 10 is lowered, based on the value of the pitching acceleration, a change in the vehicle body posture in which the vehicle body 10 is banked to the first side in the vehicle width direction thereafter is predicted. In this case, a lag in the lighting of the auxiliary lamp 6 may be prevented by advancing the timing at which the auxiliary lamp 6 starts to be lighted. Thus, the change in the vehicle body posture due to the pitching motion of the vehicle body 10 has a tendency in which the vehicle body 10 is banked to the first side in the vehicle width direction. In contrast, in a case where the detecting section detects that the posture of the vehicle body 10 has been changed in such a manner that the front portion of the vehicle body 10 is raised in a rearward direction, based on the value of the pitching acceleration, a change in the vehicle body posture in which the vehicle body 10 is tilted toward the upright state thereafter is predicted. In this case, a lag in the lighting-off of the auxiliary lamp 6 may be prevented by advancing the timing at which the auxiliary lamp 6 starts to be turned off, to prevent, for example, the situation in which the person riding in the vehicle coming from the opposite direction is bothered by the glaring light emitted from the auxiliary lamp 6. Thus, the change in the vehicle body posture due to the pitching motion of the vehicle body 10 has a tendency in which the vehicle body 10 is tilted from the bank state toward the upright state.

Further, the compensation amount of the set bank angle may be decided based on the vehicle state in addition to the bank angular velocity and the bank angle. The vehicle state means a vehicle speed, an engine speed, a gear ratio, a traveling mode, a brake operation, a throttle valve opening degree, or the like. A vehicle state detecting section detects at least one of these. For example, in a case where the controller 8 determines that a change over time of the bank angle of the vehicle body 10 will be increased, based on the vehicle state, the timing at which the auxiliary lamp 6 starts to be lighted or the timing at which the auxiliary lamp 6 starts to be turned off may be advanced. Also, in a case where the change over time of the vehicle body posture for a unit time period is significant, for example, the motorcycle 1 slaloms frequently, the timing at which the auxiliary lamp 6 starts to be lighted or the timing at which the auxiliary lamp 6 starts to be turned off may be advanced.

Although in the above-described embodiments, the compensation amount of the set bank angle is decided based on the bank angular velocity and the bank angle, the compensation amount of the set bank angle may be decided based on only the bank angular velocity. In this case, the lighting control section 8b decides the compensation amount of the set bank angle in such a manner that the absolute value of the compensation amount in a case where the absolute value of the bank angular velocity is a first value is set to be larger than the absolute value of the compensation amount in a case where the absolute value of the bank angular velocity is a second value smaller than the first value. The coefficient of the formula (2) may be a value set based on the vehicle speed instead of the bank angle, or based on the bank angle and the vehicle speed. Although in the above-described Embodiment 1 to Embodiment 4, the auxiliary lamps 6a to 6c disposed on the first side in the vehicle width direction relative to the head lamp 5 are lighted when the vehicle body 10 is banked to the first side in the vehicle width direction, the auxiliary lamps 6d to 6f disposed on the second side in the vehicle width direction relative to the head lamp 5 may be lighted. To light the auxiliary lamp 6, the lens of the auxiliary lamp 6 may be rotated by an angle corresponding to the magnitude of the bank angle of the vehicle body 10 to irradiate the road surface 15 of the region to which the motorcycle 1 turns. In a case where a screen is placed in a direction perpendicular to the forward and rearward direction of the vehicle body 10, in front of the head lamp 5, and the head lamp 5 and the auxiliary lamps 6 emit the light to the screen, a positional relationship between a head lamp irradiation region and auxiliary lamp irradiation regions which is set on the screen in a state in which the vehicle body 10 is banked is similar to a positional relationship between the head lamp irradiation region 50 and the auxiliary lamp irradiation regions 60 which is set on the road surface 15 in a state in which the vehicle body 10 is banked.

Although in the above-described embodiments, the motorcycle 1 has been specifically described as the vehicle, this is merely exemplary. For example, the present invention is applicable to other vehicles such as a three-wheeled vehicle or a four-wheeled vehicle (e.g., all-terrain vehicle), or a ship such as a personal watercraft so long as a body is banked while the vehicle is traveling. For example, in a case where the vehicle is the four-wheeled vehicle, the lighting operations of the auxiliary lamps may be controlled based on a yawing angular velocity or a yawing angle around an axis (yawing axis) of the vehicle body extending in a vertical direction.

The invention claimed is:

1. A vehicle which turns in a state in which a vehicle body is banked from an upright state to a first side in a vehicle width direction of the vehicle body, the vehicle comprising:
   a lamp which is attached to the vehicle body, and irradiates a lamp irradiation region set in front of the vehicle body;
   a detecting section which detects a change over time of a posture of the vehicle body while the vehicle is traveling, the change over time of the posture including a change amount of a bank angle per unit time; and
   a control section which controls the lamp in such a manner that the lamp irradiation region is changed based on the change over time of the posture of the vehicle body which is detected by the detecting section, wherein
   the control section advances timing at which the lamp irradiation region starts to be changed in such a manner that the timing is earlier with an increase in the change amount of the bank angle per unit time in a direction in which the vehicle body is banked to the first side in the vehicle width direction.

2. The vehicle according to claim 1, further comprising:
   a bank angle detecting section which detects a bank angle of the vehicle body,
   wherein the control section decides timing at which the lamp irradiation region starts to be changed, based on the change over time of the posture of the vehicle body which is detected by the detecting section and the bank angle detected by the bank angle detecting section.

3. The vehicle according to claim 1,
   wherein the control section limits a change in the lamp irradiation region when a bank angle of the vehicle body or the change over time of the posture of the vehicle body in the direction in which the vehicle body is banked to the first side in the vehicle width direction exceeds an upper limit value.

4. The vehicle according to claim 1,
   wherein the control section limits a change in the lamp irradiation region when a bank angle of the vehicle body or the change over time of the posture of the vehicle body in the direction in which the vehicle body is banked to the first side in the vehicle width direction is less than a lower limit value.

5. The vehicle according to claim 1,
wherein the lamp includes a head lamp, and an auxiliary lamp disposed at a location that is outward in the vehicle width direction relative to the head lamp,
wherein the lamp irradiation region includes a head lamp irradiation region irradiated by the head lamp, and an auxiliary lamp irradiation region which is set in front of the head lamp irradiation region and is irradiated by the auxiliary lamp, and
wherein the control section changes the lamp irradiation region based on the change over time of the posture of the vehicle body.

6. The vehicle according to claim 5,
wherein the control section changes timing at which the auxiliary lamp starts to be lighted to change the lamp irradiation region.

7. The vehicle according to claim 6,
wherein the control section performs an initial control for gradually increasing luminosity of light emitted from the auxiliary lamp with an increase in a bank angle of the vehicle body from the timing at which the auxiliary lamp starts to be lighted.

8. The vehicle according to claim 5,
wherein the control section increases a change rate of luminosity of light emitted from the auxiliary lamp with respect to a bank angle of the vehicle body, with an increase in the change over time of the posture of the vehicle body in the direction in which the vehicle body is banked to the first side in the vehicle width direction.

9. The vehicle according to claim 6,
wherein the control section causes the auxiliary lamp to be lighted in a predetermined set lighting state at predetermined luminosity of the light, when the control section detects that the vehicle body is in a predetermined set bank state, and
wherein the control section causes the auxiliary lamp to be lighted in a predetermined preceding lighting state at predetermined luminosity of the light which is lower than that of the predetermined set lighting state, when the control section detects that the vehicle body is in a predetermined preceding bank state which occurs before the vehicle body reaches the predetermined set bank state.

10. The vehicle according to claim 5,
wherein the lamp is the head lamp,
wherein the lamp irradiation region is the head lamp irradiation region irradiated by the head lamp, and
wherein the control section rotates the head lamp irradiation region in a direction opposite to a direction in which the vehicle body is banked, based on the change over time of the posture of the vehicle body, to change the head lamp irradiation region.

11. A vehicle which turns in a state in which a vehicle body is banked from an upright state toward a bank state where the vehicle body is banked to a first side in a vehicle width direction of the vehicle body, the vehicle comprising:
a head lamp which is attached to the vehicle body, and irradiates a head lamp irradiation region set in front of the vehicle body;
an auxiliary lamp which is attached to the vehicle body, and irradiates an auxiliary lamp irradiation region set in front of the head lamp irradiation region, on the first side in the vehicle width direction;
a detecting section which detects a change over time of a posture of the vehicle body while the vehicle is traveling, the change over time of the posture including a change amount of a bank angle per unit time; and
a control section which decides timing at which the auxiliary lamp starts to be turned off, based on the change over time of the posture of the vehicle body which is detected by the detecting section, wherein
the control section advances timing at which the auxiliary lamp starts to be turned off in such a manner that the timing is earlier with an increase in the change amount of the bank angle per unit time in a direction in which the vehicle body is tilted from the bank state toward the upright state.

* * * * *